(12) United States Patent
Kanekawa et al.

(10) Patent No.: US 9,020,704 B2
(45) Date of Patent: Apr. 28, 2015

(54) ELECTRONIC CONTROL APPARATUS

(71) Applicant: Hitachi Automotive Systems, Ltd., Hitachinaka-shi, Ibaraki (JP)

(72) Inventors: Nobuyasu Kanekawa, Hitachi (JP); Ryoichi Kobayashi, Naka-gun (JP); Tomonobu Koseki, Isesaki (JP); Keisuke Honda, Hitachinaka (JP); Atsushi Uehara, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/253,264

(22) Filed: Apr. 15, 2014

(65) Prior Publication Data

US 2014/0229074 A1  Aug. 14, 2014

Related U.S. Application Data

(63) Continuation of application No. 13/704,864, filed as application No. PCT/JP2011/063725 on Jun. 15, 2011, now Pat. No. 8,738,232.

(30) Foreign Application Priority Data

Jun. 18, 2010  (JP) .................................. 2010-139566

(51) Int. Cl.
*B62D 6/08*  (2006.01)
*H02J 1/00*  (2006.01)
*B62D 5/04*  (2006.01)
*B60R 16/033*  (2006.01)

(52) U.S. Cl.
CPC ............... *B62D 6/08* (2013.01); *B62D 5/0481* (2013.01); *H02J 1/00* (2013.01); *B62D 5/0484* (2013.01); *B60R 16/033* (2013.01)

(58) Field of Classification Search
USPC .............. 701/41–44; 180/443–446, 404, 405, 180/407, 6.2, 6.28; 280/771, 263
See application file for complete search history.

(56) References Cited

U.S. PATENT DOCUMENTS

| | | | |
|---|---|---|---|
| 6,243,597 B1 | 6/2001 | Daanen | |
| 6,862,676 B1* | 3/2005 | Knapp et al. | .................. 712/217 |
| 6,972,700 B2 | 12/2005 | Kanekawa et al. | |
| 7,009,535 B2 | 3/2006 | Kanekawa et al. | |
| 2006/0196722 A1* | 9/2006 | Makabe et al. | ............... 180/443 |
| 2010/0001586 A1* | 1/2010 | Bernard et al. | .................. 307/65 |
| 2010/0109600 A1* | 5/2010 | Osinga et al. | .................. 320/101 |
| 2010/0185893 A1* | 7/2010 | Wang et al. | ....................... 714/3 |
| 2010/0286870 A1* | 11/2010 | Endo et al. | ...................... 701/41 |
| 2010/0292894 A1* | 11/2010 | Essaili et al. | .................... 701/37 |

FOREIGN PATENT DOCUMENTS

JP  2005-315840 A  11/2005
JP  2008-253045 A  10/2008
(Continued)

OTHER PUBLICATIONS

Corresponding International Search Report with English Translation dated Aug. 23, 2011 (four (4) pages).

*Primary Examiner* — Mary Cheung
*Assistant Examiner* — Rodney Butler
(74) *Attorney, Agent, or Firm* — Crowell & Moring LLP

(57) ABSTRACT

An electronic control apparatus includes a control unit, a plurality of power supply units for supplying the control unit with power, and a power supply fault detector unit for detecting a fault in the plurality of power supply units. The control unit operates in a normal mode on electric power supplied from the plurality of power supply units when none of the plurality of power supply units is faulty.

16 Claims, 20 Drawing Sheets

(56) References Cited

FOREIGN PATENT DOCUMENTS

| | | | |
|---|---|---|---|
| JP | 2009-29196 A | | 2/2009 |
| JP | 2009029196 A | * | 2/2009 |
| JP | 2009-61894 A | | 3/2009 |
| JP | 2009061894 A | * | 3/2009 |
| JP | 2009-153030 A | | 7/2009 |

* cited by examiner

| Case | POWER SUPPLY UNIT 1-1 NORMAL | POWER SUPPLY UNIT 1-2 NORMAL | FIRST CONTROL UNIT 2-1 NORMAL | SECOND CONTROL UNIT 2-2 NORMAL | FIRST CONTROL UNIT 2-1 OUTPUT SELECT | SECOND CONTROL UNIT 2-2 OUTPUT SELECT | RELAY 7-0, 7-1 ON |
|---|---|---|---|---|---|---|---|
| 1 | Y | Y | Y | Y | Y | N | Y |
| 2 | Y | Y | Y | N | Y | N | Y |
| 3 | Y | Y | N | Y | N | Y | Y |
| 4 | Y | Y | N | N | N | N | N |
| 5 | Y | N | Y | Y | N | Y | Y |
| 6 | Y | N | Y | N | N | N | N |
| 7 | Y | N | N | Y | N | Y | Y |
| 8 | Y | N | N | N | N | N | N |
| 9 | N | Y | Y | Y | N | Y | Y |
| 10 | N | Y | Y | N | N | N | N |
| 11 | N | Y | N | Y | N | Y | Y |
| 12 | N | Y | N | N | N | N | N |
| 13 | N | N | Y | Y | N | N | N |
| 14 | N | N | Y | N | N | N | N |
| 15 | N | N | N | Y | N | N | N |
| 16 | N | N | N | N | N | N | N |

| ina | inb | Q1 | Q2 | Q3 | Q4 | RL |
|-----|-----|-----|-----|-----|-----|-----|
| L | L | ON | ON | OFF | OFF | OFF |
| L | H | OFF | ON | OFF | ON | ON |
| H | L | ON | OFF | ON | OFF | ON |
| H | H | OFF | OFF | ON | ON | OFF |

FIG.9

| FAULTY SPOT | DETECTION MEANS | CONTINUED OPERATION/ FAIL-SAFE MEANS |
|---|---|---|
| POWER SUPPLY UNIT 1-1 | DETECTED BY THE FIRST CONTROL FAULT DETECTOR UNIT 3-1 | SWITCHED TO THE SECOND CONTROL UNIT 2-2 |
| POWER SUPPLY UNIT 1-2 | | |
| FIRST CONTROL UNIT 2-1 | DETECTED BY THE FIRST CONTROL FAULT DETECTOR UNIT 3-1 | SWITCHED TO THE SECOND CONTROL UNIT 2-2 |
| SECOND CONTROL UNIT 2-2 | DETECTED BY THE SECOND CONTROL FAULT DETECTOR UNIT 3-2 | FIRST CONTROL UNIT 2-1 AND POWER SUPPLY OPERATIONAL : CONTINUED OPERATION ELSE : RELAY 7-0,7-1 OPEN |
| FIRST CONTROL FAULT DETECTOR UNIT 3-1 | DETECTED BY THE ECU FAULT DETECTOR UNIT 3-3 (EXCLUSIVE OR GATE 41) | RELAYS 7-0,7-1 OPEN |
| SECOND CONTROL FAULT DETECTOR UNIT 3-2 | | |
| ECU FAULT DETECTOR UNIT 3-3 (EXCLUSIVE OR GATE 41) | FAIL-SAFE CONFIGURATION USING Q1 TO Q4 (FIG.8) | RELAYS 7-0,7-1 OPEN |

FIG.10

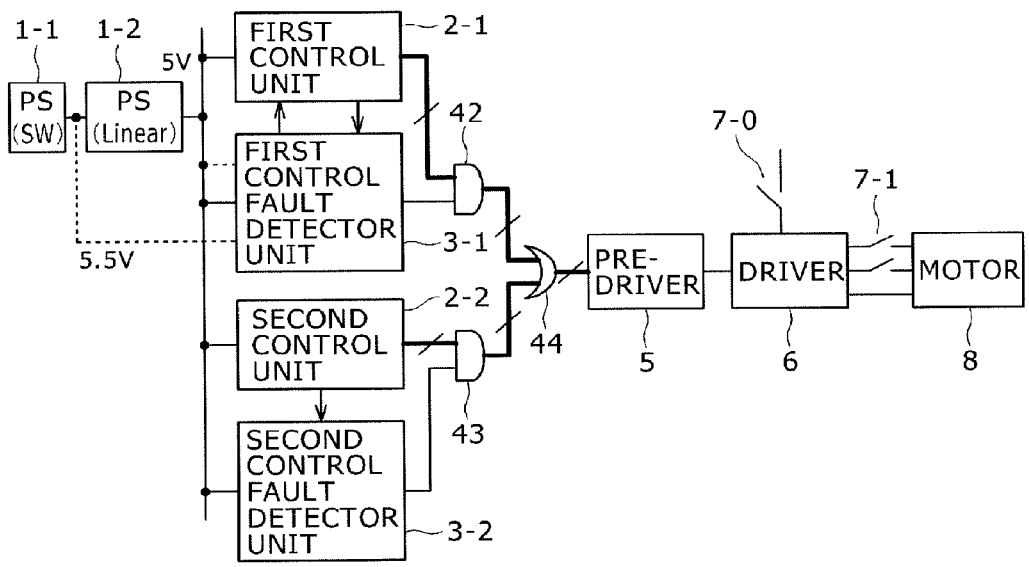

2-2 : SECOND CONTROL UNIT

|  |  | in2 | | |
|---|---|---|---|---|
|  |  | P | 0 | -P |
| in1 | 1 | P | 0 | L |
|  | 0 | 0 | 0 | 0 |
|  | -1 | L | 0 | P |

|  | | in2 | |
|---|---|---|---|
|  | | 1 | -1 |
| in1 | 1 | 1 | 0 |
|  | -1 | 0 | 1 |

|  | | xr | |
|---|---|---|---|
|  | | 1 | -1 |
|  | P | OK | NG |
| xo | 0 | OK | OK |
|  | L | NG | OK |

FIG.32

| Uo | sin θ | cos θ | τ | Diag Result |
|---|---|---|---|---|
| P | >1/sqrt(3) | * | + | OK |
|   | <-1/sqrt(3) | * | − | OK |
|   | else | | | NG |
| 0 | >1/sqrt(3) | * | − | NG |
|   | <-1/sqrt(3) | * | + | NG |
|   | else | | | OK |
| L | >1/sqrt(3) | * | − | OK |
|   | <-1/sqrt(3) | * | + | OK |
|   | else | | | NG |

FIG.33

| Vo | sin θ | cos θ | τ | Diag Result |
|---|---|---|---|---|
| P | <1/sqrt(3) | + | + | OK |
|   | >-1/sqrt(3) | − | − | OK |
|   | else | | | NG |
| 0 | <1/sqrt(3) | + | − | NG |
|   | >-1/sqrt(3) | − | + | NG |
|   | else | | | OK |
| L | <1/sqrt(3) | + | − | OK |
|   | >-1/sqrt(3) | − | + | OK |
|   | else | | | NG |

FIG.34

| Wo | sin θ | cos θ | τ | Diag Result |
|---|---|---|---|---|
| P | <1/sqrt(3) | − | + | OK |
|   | >-1/sqrt(3) | + | − | OK |
|   | else | | | NG |
| 0 | <1/sqrt(3) | − | − | NG |
|   | >-1/sqrt(3) | + | + | NG |
|   | else | | | OK |
| L | <1/sqrt(3) | − | − | OK |
|   | >-1/sqrt(3) | + | + | OK |
|   | else | | | NG |

FIG.35

| Uo | | sin θ | cos θ | τ | Diag Result |
|---|---|---|---|---|---|
| P | | + | * | + | OK |
| | | − | * | − | |
| | | else | | | NG |
| 0 | | | * | | OK |
| L | | + | * | − | OK |
| | | − | * | + | |
| | | else | | | NG |

FIG.36

| Vo | | sin θ | cos θ | τ | Diag Result |
|---|---|---|---|---|---|
| P | | * | + | + | OK |
| | | * | − | − | |
| | | else | | | NG |
| | | | * | | OK |
| L | | * | + | − | OK |
| | | * | − | + | |
| | | else | | | NG |

FIG.37

| Wo | | sin θ | cos θ | τ | Diag Result |
|---|---|---|---|---|---|
| P | | * | − | + | OK |
| | | * | + | − | |
| | | else | | | NG |
| | | | * | | OK |
| L | | * | − | − | OK |
| | | * | + | + | |
| | | else | | | NG |

ELECTRONIC CONTROL APPARATUS

This application is a continuation of U.S. application Ser. No. 13/704,864, filed Dec. 17, 2012, which is a National Stage application of PCT International Application PCT/JP2011/063725, filed on Jun. 15, 2011, which claims priority under 35 U.S.C. §119 to Japanese Patent Application No. 2010-139566, filed Jun. 18, 2010, the disclosures of which are expressly incorporated by reference herein.

TECHNICAL FIELD

The present invention relates, in general, to electronic control apparatuses and, in particular, to an electronic control apparatus for automobiles that enables continued operation, for example, even in faulty conditions.

BACKGROUND ART

Advances in automated control have resulted in mounting needs for safety and reliability in electronic control apparatuses. To achieve safety in the electronic control apparatus, what is required is to detect immediately a fault, as soon as it occurs, and to bring operation to a stop. An even later requirement is to enable continued operation while ensuring safety even when a fault occurs. Take, for instance, an automotive electric power steering system. What is now required is to, should a fault occur, bring the system to an immediate stop, specifically, to disable steering effort assist by an electric motor, if self-steer or other hazardous operation may be performed during the faulty condition, thereby preventing such a hazardous operation.

Lately, because of enhanced performance accompanying the advances in technology, vehicles with greater weight have come to incorporate electric power steering systems. As a result, if the steering effort assist by the electric motor is disabled when a fault occurs, a large steering effort is required in vehicles with greater weight, which makes manual steering difficult. The electric power steering system incorporated in such a vehicle with greater weight is thus required to continue operating, while ensuring safety, even when a fault occurs.

To detect a fault of a first microprocessor that controls an object under control, a method is widely known in which a monitoring microprocessor is incorporated, and the monitoring microprocessor and the first microprocessor cross-check each other. Another known method makes the first microprocessor redundant (doubling), thereby making a comparative check of outputs from the two first microprocessors.

Without doubling of the first microprocessor, a control logic circuit or a data path may be formed of redundancy code logic, such as a parity or an error detection and correction code, or an inspection circuit may be incorporated to perform a self-check. Alternatively, as disclosed in patent document 1, a torque monitoring function is incorporated in addition to a first microprocessor and the first microprocessor is determined to be faulty when excessive steering torque is input from a torque sensor. In addition, to allow the operation to continue while ensuring safety of the electronic control apparatus when a fault occurs, a method is widely used in which each of subsystems constituting the control apparatus is made redundant.

Patent Document 1
JP-2005-315840-A

SUMMARY OF THE INVENTION

Problem to be Solved by the Invention

Of the related-art methods described above, the one for making the subsystems redundant to enable continued operation requires further consideration of circuit scale, dimensions, weight, and cost reduction. The method for making the subsystems redundant entails concern over an increase in circuit scale, dimensions, weight, and cost.

The present invention has been made in view of the foregoing and it is an object of the present invention to provide an electronic control apparatus that enables continued operation during a faulty condition, while preventing circuit scale, dimensions, weight, and cost from increasing.

Means for Solving the Problem

To achieve the foregoing object, the present invention takes the following measures.

(1) The electronic control apparatus includes a plurality of voltage regulators connected to a power supply function, specifically, a battery or a generator, the voltage regulators for supplying a predetermined voltage. When all of the voltage regulators are operational, a control unit is operated on electric power supplied from the voltage regulators. If any of the voltage regulators is faulty, either one of the following methods (2) and (3) is employed to reduce power consumption of the control unit and the control unit is operated on electric power supplied from the voltage regulator that remains operational.

(2) If any of the voltage regulators is faulty, an operating clock frequency of a processor constituting the control unit is reduced.

(3) Instead of (2) above, the control unit is formed to include a master control unit and a slave control unit that has a function simpler, and a circuit smaller in scale, than those of the master control unit. When all of the voltage regulators are operational and the master control unit control unit is operational, the master control unit is operated. If any of the voltage regulators is faulty or the master control unit is faulty, the slave control unit is operated.

Effects of the Invention

The power supply unit is made redundant and its capacity is divided through measure (1) above out of the measures described above. Each of power supply units can then have a smaller capacity and redundancy prevents the circuit scale from being enlarged. In addition, measure (3) allows the slave control unit provided for a case in which the master control unit fails to be utilized as means for reduction in power consumption of processing functions when the power supply unit is faulty. This specification embraces descriptions of the specification and/or drawings of Japanese Patent Application No. 2010-139566 that serves as the basis for the right of priority of this application.

BRIEF DESCRIPTION OF THE DRAWINGS

FIG. 9 is a table illustrating system operations relative to faults at different parts.

FIG. 10 is a diagram illustrating an example of a sixth embodiment.

FIG. 32 is a diagram illustrating an embodiment that finds an ON-enable condition directly from a magnetic pole position.

FIG. 33 is a diagram illustrating an embodiment that finds an ON-enable condition directly from a magnetic pole position.

FIG. 34 is a diagram illustrating an embodiment that finds an ON-enable condition directly from a magnetic pole position.

FIG. 35 is a diagram illustrating an embodiment that finds an ON-enable condition directly from a magnetic pole position.

FIG. 36 is a diagram illustrating an embodiment that finds an ON-enable condition directly from a magnetic pole position.

FIG. 37 is a diagram illustrating an embodiment that finds an ON-enable condition directly from a magnetic pole position.

Figure 1:
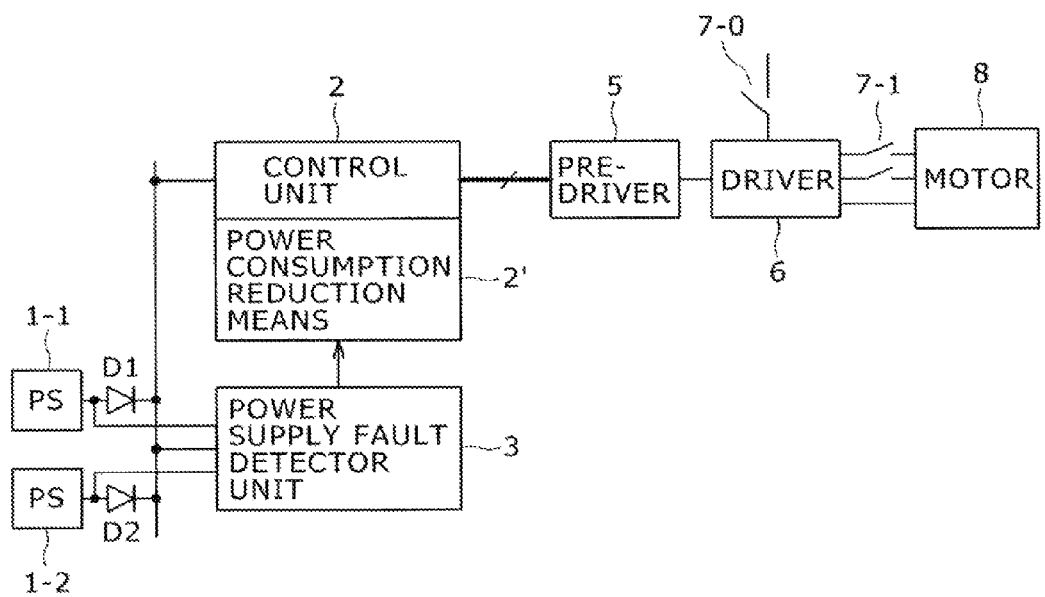
FIG. 1 is a block diagram illustrating a first embodiment.

DESCRIPTION OF REFERENCE NUMERALS 1-1, 1-2: Power supply unit
2: Control unit
2': Power consumption reduction means
2-1: First control unit
2-2: Second control unit
3: Power supply fault detector unit
3-1: First control fault detector unit
3-2: Second control fault detector unit
6: Driver (three-phase bridge)
8: Motor
11: Rotation angle sensor
12: Torque sensor
13: Current sensor
18: Selector switch (selection changeover unit)
21: Coordinate converter section
22: Phase converter section
23: Torque converter section
24: Multiplier section

BEST MODES FOR CARRYING OUT THE INVENTION

Each of embodiments will be described below with reference to the accompanying drawings.

First Embodiment

FIG. 1 is a block diagram illustrating a first embodiment.

The first embodiment represents a basic exemplary arrangement of an electronic control apparatus for automobiles according to an aspect of the present invention.

The electronic control apparatus includes a control unit 2, two power supply units 1-1, 1-2, a pre-driver 5, a driver 6, a motor 8, and a power supply fault detector unit 3.

Each of the power supply units 1-1, 1-2 includes, for example, a voltage regulator, connected to a battery or a generator, for supplying a predetermined voltage. The power supply units 1-1, 1-2 are connected to the control unit 2 via diodes D1, D2, respectively, thereby supplying the control unit 2 with electric power.

Receiving the electric power from the two power supply units 1-1, 1-2, the control unit 2 outputs a control signal (three-phase, six lines each for upper and lower arms) to the pre-driver 5. The pre-driver 5 drives the driver 6 according to the control signal input thereto from the control unit 2.

The driver 6 is connected to the battery or the generator not shown via a main relay 7-0. Through switching of the electric power supplied from the battery or the generator, the driver 6 outputs current to the motor 8 via a phase output relay 7-1, thereby driving the motor 8.

The main relay 7-0 and the phase output relay 7-1 function to stop operation of the driver 6 and the motor 8 thereby ensuring safety, when a fault occurs in the control unit 2, the pre-driver 5, the driver 6, or the motor 8.

The power supply fault detector unit 3 monitors output voltages of the power supply units 1-1, 1-2. Determining that either one of the power supply units 1-1, 1-2 is faulty based on the output voltage falling outside a predetermined range, the power supply fault detector unit 3 outputs an electric power reduction signal 30 to the control unit 2.

The control unit 2 operates in a normal mode on the electric power supplied from the power supply units 1-1, 1-2, when none of the power supply units 1-1, 1-2 is faulty. If any of the power supply units 1-1, 1-2 is faulty, the control unit 2 operates in an energy saving mode on the electric power supplied from the power supply unit that remains fully operational, consuming less power.

The control unit 2 includes power consumption reduction means 2' as an internal function. Receiving an input of the electric power reduction signal 30 from the power supply fault detector unit 3, the power consumption reduction means 2' reduces power consumption of the control unit 2.

Second Embodiment

Figure 2:
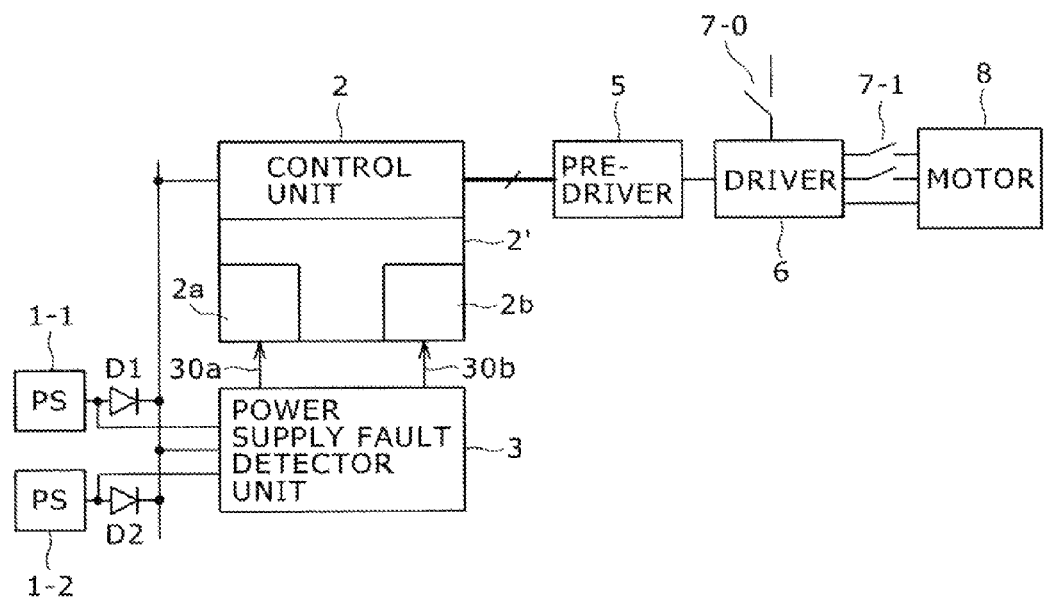
FIG. 2 is a block diagram illustrating a second embodiment.

FIG. 2 is a block diagram illustrating a second embodiment that demonstrates a method for reducing power consumption of the control unit. When either one of power supply units 1-1, 1-2 is faulty, a power supply fault detector unit 3 outputs a clock reduction signal 30*a* and a parameter change signal 30*b* as an electric power reduction signal 30. Power consumption reduction means 2' of a control unit 2 includes clock reduction means 2*a* and parameter change means 2*b*. Based on the clock reduction signal 30*a* input from the power supply fault detector unit 3, the clock reduction means 2*a* reduces an operating clock frequency of the control unit 2 to thereby reduce power consumption. It should be noted that, when the operating clock frequency is reduced, a time scale in operation of the control unit 2 changes accordingly. The parameter change means 2*b* thus changes parameters by performing any of, for example, methods (1) to (3) listed below according to the parameter change signal 30*b* input from the power supply fault detector unit 3.

(1) Change a division ratio of a timer to thereby ensure that the time scale is not changed.

(2) Change a control parameter, such as an integral coefficient and a differential coefficient, to thereby respond to a change in the time scale.

(3) Change control algorithm to be preformed.

Method (1) is used when processing time is amply available and processing can be completed within a predetermined control cycle even with a reduced operating clock frequency. Method (2) is used if controllability is not greatly affected even with an extended control cycle as a result of a reduced operating clock frequency. Method (3) is used when the processing time is limited and the processing algorithm needs to be changed to achieve required controllability.

Figure 3:
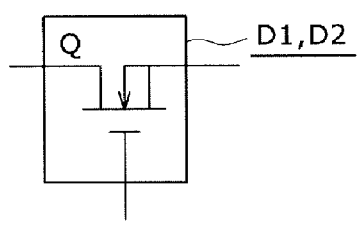
FIG. 3 is a diagram illustrating an exemplary configuration of a diode.

Diodes D1, D2 may be configured as a MOSFET as shown in FIG. 3, which allows a forward voltage drop to be reduced. In addition, gate control enables the arrangement to respond to a fault mode in which the output voltage of the power supply units 1-1, 1-2 is higher than a specified level.

Third Embodiment

Figure 4:
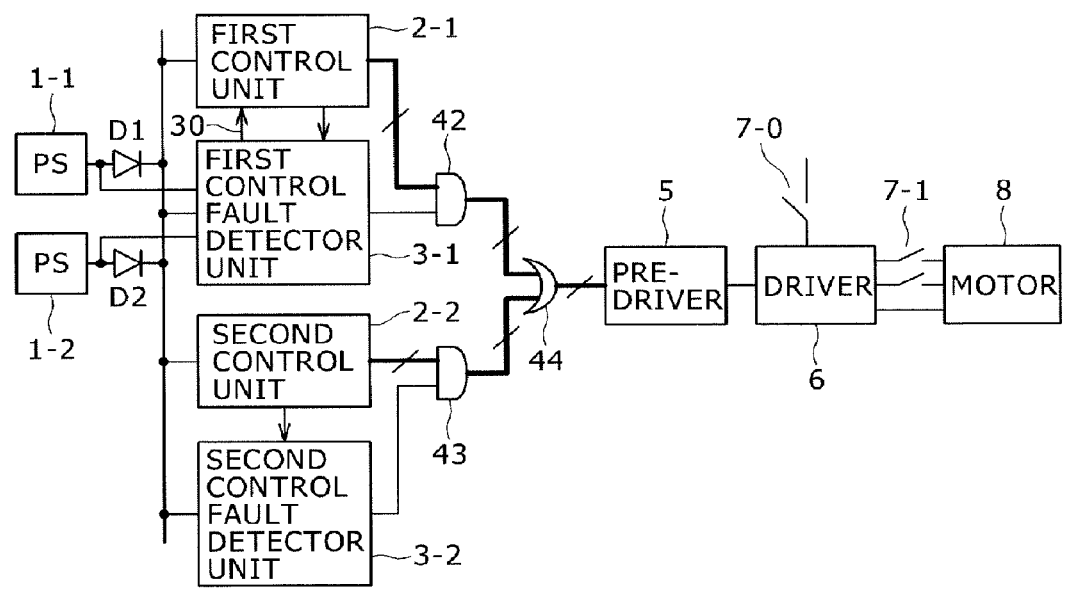
FIG. 4 is a block diagram illustrating a third embodiment.

A third embodiment represents an arrangement that includes, as shown in FIG. 4, a first control unit 2-1 (a master control unit) and a second control unit 2-2 (a slave control unit) that employs a control method that is simpler than that of the first control unit 2-1 to thereby make a circuit scale small and reduce power consumption, the first control unit 2-1 being switched to the second control unit 2-2.

Power supply units 1-1, 1-2 supply power to the first control unit 2-1, the second control unit 2-2, a first control fault detector unit 3-1, and a second control fault detector unit 3-2 via diodes D1, D2. Control signals (three-phase, six lines each for the upper and lower arms) from the first control unit 2-1 and the second control unit 2-2 are output to a pre-driver 5 via AND gates 42, 43 and an OR gate 44. Then, a driver 6 eventually drives a motor 8.

The first control fault detector unit 3-1 diagnoses the first control unit 2-1 and the power supply units 1-1, 1-2 to determine whether each is operational. When all are fully operational, the output is turned ON, so that the control signal from the first control unit 2-1 is output to the pre-driver 5 via the AND gate 42 and the OR gate 44.

The second control fault detector unit 3-2 diagnoses the first control unit 2-1, the second control unit 2-2, and the power supply units 1-1, 1-2 to determine whether each is operational. When any one of the first control unit 2-1 and the power supply units 1-1, 1-2 is faulty and the second control unit 2-2 is operational, the output is turned ON to thereby output the control signal from the second control unit 2-2 to the pre-driver 5 via the AND gate 43 and the OR gate 44.

The above-described embodiment includes the second control unit 2-2, which achieves an electronic control apparatus that can respond to not only a fault of the first control unit 2-1, but also a fault of the power supply units 1-1, 1-2.

Fourth Embodiment

Figure 5:
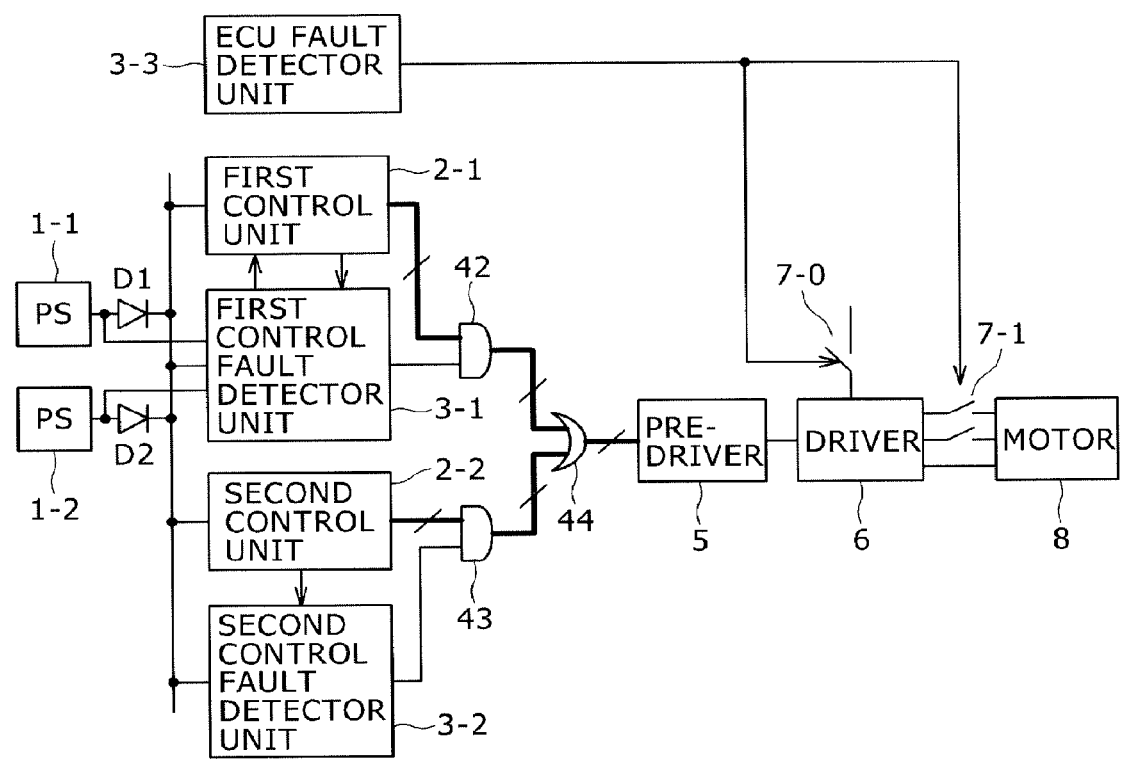
FIG. 5 is a block diagram illustrating a fourth embodiment.

A fourth embodiment represents an arrangement that includes, as shown in FIG. 5, an ECU fault detector unit 3-3 that controls a main relay 7-0 and a phase output relay 7-1.

When either a control signal from a first control unit 2-1 or a control signal from a second control unit 2-2 is normal, the ECU fault detector unit 3-3 turns ON the main relay 7-0 to supply power to a driver 6 and turns ON the phase output relay 7-1 to thereby supply the output to, and drive, a motor 8.

If neither the control signal from the first control unit 2-1 nor the control signal from the second control unit 2-2 is normal, the main relay 7-0 is turned OFF to shut down the power supply to the driver 6 and the phase output relay 7-1 is turned OFF to cut off the output, thereby de-energizing the motor 8.

In the embodiment described above, if the motor 8 cannot be driven normally, the drive can be stopped, which can avoid danger of erroneously driving the motor 8.

Figures 6, 7:
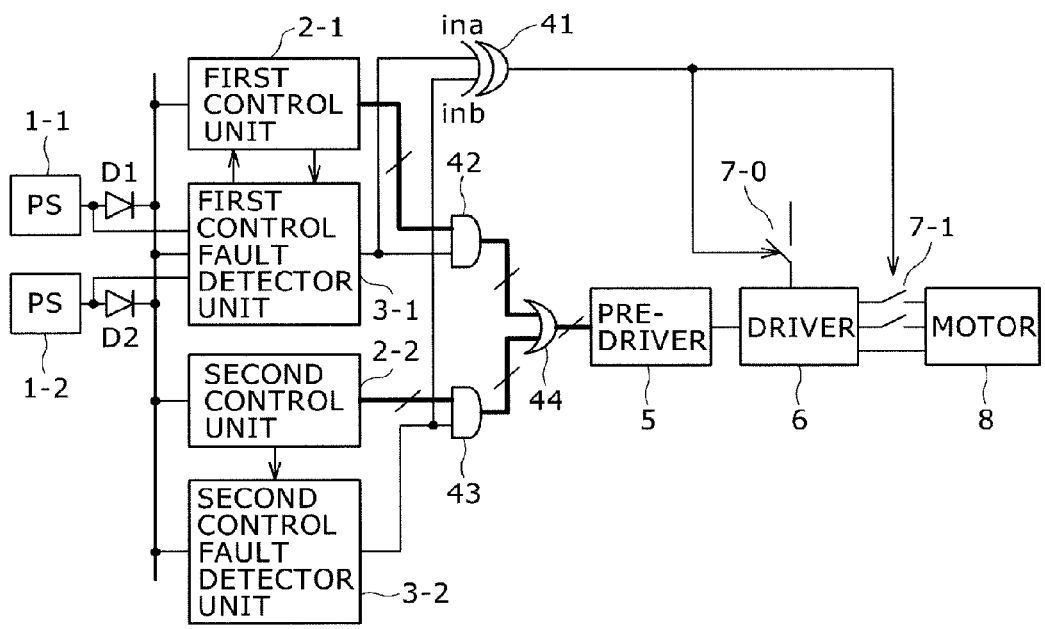
FIG. 6 is a table illustrating operating states of different parts during a faulty condition.
FIG. 7 is a block diagram illustrating a fifth embodiment.

FIG. 6 is a table illustrating operating states of different parts during a faulty condition.

In case 1, the power supply units 1-1, 1-2, the first control unit 2-1, and the second control unit 2-2 are all normal (Y), so that the control signal output from the first control unit 2-1 is selected (first control unit 2-1 output select (Y)) and the main relay 7-0 and the phase output relay 7-1 are turned ON (Y), thus causing the driver 6 to drive the motor 8.

In case 2, the second control unit 2-2 is faulty (N); however, the first control unit 2-1 is fully operational, so that the control signal output from the first control unit 2-1 is selected (first control unit 2-1 output select (Y)), the main relay 7-0 and the phase output relay 7-1 are turned ON (Y), and the motor 8 is driven by the driver 6.

In case 3, the first control unit 2-1 is faulty (N), so that the control signal output from the second control unit 2-2 is selected (second control unit 2-2 output select (Y) and first control unit 2-1 output select (N)), the main relay 7-0 and the phase output relay 7-1 are turned ON, and the motor 8 is driven by the driver 6.

In case 4, both the first control unit 2-1 and the second control unit 2-2 are faulty (N) and thus no normal control signal can be obtained. The main relay 7-0 and the phase output relay 7-1 are then turned OFF and drive of the motor 8 by the driver 6 is stopped.

In case 5, the power supply unit 1-2 is faulty (N) electric power for operating the first control unit 2-1 cannot be supplied, so that the control signal output from the second control unit 2-2 is selected (second control unit 2-2 output select (Y) and first control unit 2-1 output select (N)), the main relay 7-0 and the phase output relay 7-1 are turned ON, and the motor 8 is driven by the driver 6.

In case 6, both the power supply unit 1-2 and the second control unit 2-2 are faulty (N) and electric power required for operating the first control unit 2-1 cannot be supplied. Neither the first control unit 2-1 nor the second control unit 2-2 can then provide normal control signals, so that the main relay 7-0 and the phase output relay 7-1 are turned OFF and drive of the motor 8 by the driver 6 is stopped.

In case 7, both the power supply unit 1-2 and the first control unit 2-1 are faulty (N) and electric power required for operating the first control unit 2-1 cannot be supplied, so that the first control unit 2-1 is unable to operate properly. The control signal output from the second control unit 2-2 is thus selected (second control unit 2-2 output select (Y)), the main relay 7-0 and the phase output relay 7-1 are turned ON, and the motor 8 is driven by the driver 6.

In case 8, the power supply unit 1-2, the first control unit 2-1, and the second control unit 2-2 are faulty (N) and no normal control signals can be obtained from the first control unit 2-1 or the second control unit 2-2. The main relay 7-0 and the phase output relay 7-1 are thus turned OFF and drive of the motor 8 by the driver 6 is stopped.

In case 9, the power supply unit 1-1 is faulty and electric power required for operating the first control unit 2-1 cannot be supplied. The control signal output from the second control unit 2-2 is thus selected (second control unit 2-2 output select (Y)), the main relay 7-0 and the phase output relay 7-1 are turned ON, and the motor 8 is driven by the driver 6.

In case 10, both the power supply unit 1-1 and the second control unit 2-2 are faulty (N) and electric power required for operating the first control unit 2-1 cannot be supplied. Neither the first control unit 2-1 nor the second control unit 2-2 can then provide normal control signals, so that the main relay 7-0 and the phase output relay 7-1 are turned OFF and drive of the motor 8 by the driver 6 is stopped.

In case 11, both the power supply unit 1-1 and the first control unit 2-1 are faulty and electric power required for operating the first control unit 2-1 cannot be supplied, so that the first control unit 2-1 is unable to operate properly. The control signal output from the second control unit 2-2 is thus selected (second control unit 2-2 output select (Y)), the main relay 7-0 and the phase output relay 7-1 are turned ON, and the motor 8 is driven by the driver 6.

In case 12, the power supply unit 1-1, the first control unit 2-1, and the second control unit 2-2 are faulty and no normal control signals can be obtained from the first control unit 2-1 or the second control unit 2-2. The main relay 7-0 and the phase output relay 7-1 are thus turned OFF and drive of the motor 8 by the driver 6 is stopped.

In case 13, both the power supply unit 1-1 and the power supply unit 1-2 are faulty and power is not supplied to the first control unit 2-1 or the second control unit 2-2. No normal control signals can then be obtained, so that the main relay 7-0 and the phase output relay 7-1 are turned OFF and drive of the motor 8 by the driver 6 is stopped.

In case 14, the power supply unit 1-1, the power supply unit 1-2, and the second control unit 2-2 are all faulty and power is not supplied to the first control unit 2-1 or the second control unit 2-2. No normal control signals can then be obtained, so that the main relay 7-0 and the phase output relay 7-1 are turned OFF and drive of the motor 8 by the driver 6 is stopped.

In case 15, the power supply unit 1-1, the power supply unit 1-2, and the first control unit 2-1 are all faulty and power is not supplied to the first control unit 2-1 or the second control unit 2-2. No normal control signals can then be obtained, so that the main relay 7-0 and the phase output relay 7-1 are turned OFF and drive of the motor 8 by the driver 6 is stopped.

In case 16, the power supply unit 1-1, the power supply unit 1-2, the first control unit 2-1, and the second control unit 2-2 are all faulty and power is not supplied to the first control unit 2-1 or the second control unit 2-2. No normal control signals can then be obtained, so that the main relay 7-0 and the phase output relay 7-1 are turned OFF and drive of the motor 8 by the driver 6 is stopped.

Additionally, a warning lamp may be turned on to warn that the electronic control apparatus is faulty in cases 2 to 16.

Fifth Embodiment

FIG. 7 shows an embodiment that embodies the ECU fault detector unit 3-3 with an exclusive OR gate 41.

Outputs from a first control fault detector unit 3-1 and a second control fault detector unit 3-2 are made to serve as inputs to the exclusive OR gate 41 and an output therefrom turns ON a main relay 7-0 and a phase output relay 7-1. If the first control fault detector unit 3-1 and the second control fault detector unit 3-2 are normal, the output (select signal) of either the first control fault detector unit 3-1 or the second control fault detector unit 3-2 turns ON. Otherwise, either the first control fault detector unit 3-1 or the second control fault detector unit 3-2 faulty, or no normal control signals can be obtained from a first control unit 2-1 and a second control unit 2-2. In this case, therefore, the main relay 7-0 and the phase output relay 7-1 are cut off to thereby stop the drive of a motor 8 by a driver 6, thereby safety of the electronic control apparatus can be ensured.

Figures 8A, 8B:
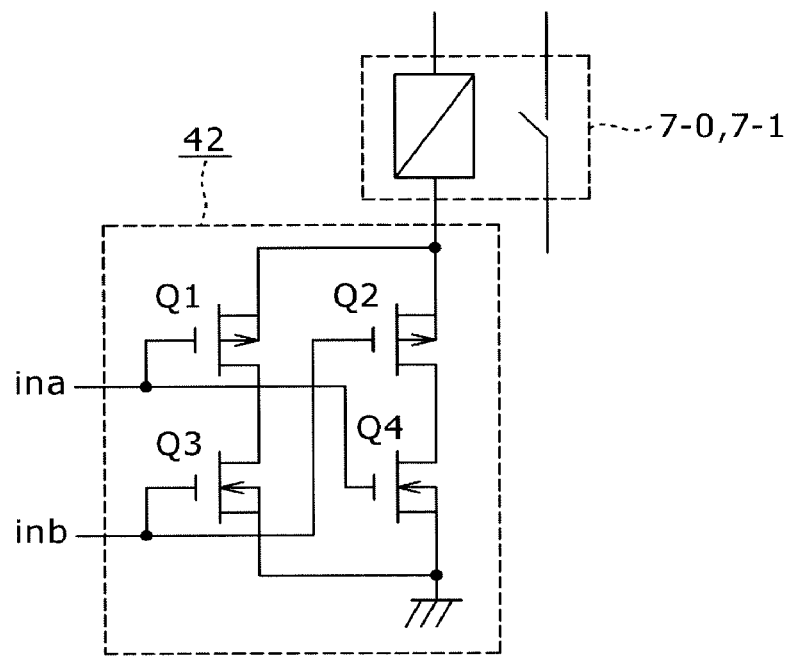
FIGS. 8(*a*) and 8(*b*) are diagrams illustrating a configuration of an exclusive OR circuit.

Additionally, the exclusive OR gate 41 may be configured using a circuit 42 that incorporates MOS transistors Q1 to Q4 as shown in FIG. 8(*a*). This prevents the main relay 7-0 and the phase output relay 7-1 from being left ON as caused by a stuck-at fault of the output of the exclusive OR gate 41.

FIGS. 8(*a*) and 8(*b*) are diagrams illustrating an exemplary configuration of the exclusive OR circuit. FIG. 8(*a*) is a circuit diagram and FIG. 8(*b*) is a circuit operation table. Referring to the table shown in FIG. 8(*b*), when both ina and inb are Hi, the first control fault detector unit 3-1 and the second control fault detector unit 3-2 are determined to be faulty.

FIG. 9 shows operations of the system to respond to faults at different parts.

A fault at a power supply unit 1-1 or a power supply unit 1-2 is detected by the first control fault detector unit 3-1 and, when one is detected, the second control unit 2-2 that consumes less power is selected to allow the operation to continue. A fault at the first control unit 2-1 is detected by the first control fault detector unit 3-1 and, when one is detected, the second control unit 2-2 is selected to allow the operation to continue.

A fault at the second control unit 2-2 is detected by the second control fault detector unit 3-2. If the first control unit 2-1 and the power supply remain operational, the operation is allowed to continue; otherwise, the main relay 7-0 and the phase output relay 7-1 are cut off to thereby stop the drive of the motor 8 by the driver 6, thus achieving safety in the electronic control apparatus. A fault at the first control fault detector unit 3-1 or the second control fault detector unit 3-2 is detected by the ECU fault detector unit 3-3 (the exclusive OR gate 41). The main relay 7-0 and the phase output relay 7-1 are then cut off to thereby stop the drive of the motor 8 by the driver 6, thus achieving safety in the electronic control apparatus.

A fault at the ECU fault detector unit 3-3 (the exclusive OR gate 41) is masked by a fail-safe configuration of Q1 to Q4 shown in FIG. 8(*a*). The drive of the motor 8 by the driver 6 is then stopped by the main relay 7-0 and the phase output relay 7-1 being cut off, thereby ensuring safety in the electronic control apparatus.

Sixth Embodiment

FIG. 10 shows an embodiment in which power supply units 1-1, 1-2 are connected in series with each other. Switching regulators are widely used for reduction in loss involved in a regulator voltage drop. The switching regulator, however, includes a large number of components and requires a component that defies easy integration, such as a coil. Consolidating functions thereof, therefore, can better reduce cost, weight, and dimensions because of economies of scale involved. Dividing power supplies in parallel with each other as an approach taken by the present invention can invite increased cost, weight, and dimensions. In this embodiment, therefore, a switching regulator is used for the power supply unit 1-1 with which the power supply unit 1-2 including a linear regulator is connected in series. The power supply unit 1-2 including the linear regulator has an output of 5.0 V and the input thereof, specifically, the output voltage of the power supply unit 1-1 including the switching regulator is slightly higher than that (e.g. 5.5 V).

If the power supply unit 1-1 including the switching regulator is faulty, the voltage supplied from the battery bypasses the power supply unit 1-1 and is applied to the power supply unit 1-2. As a result, heat generated at the power supply unit 1-2 increases. Power consumption at a control unit 2 (the first control unit 2-1) is then reduced using the method provided by the present invention and the heat generated at the power supply unit 1-2 is thereby reduced.

If the power supply unit 1-2 is faulty, the output from the power supply unit 1-1 bypasses the power supply unit 1-2 and is supplied to the control unit 2 as a load. At this time, the applied voltage is slightly higher (e.g. 5.5 V) than 5.0 V, so that heat generated at the control unit 2 increases. The power consumption of the control unit 2 is then reduced using the method provided by the present invention and the heat generated at the control unit 2 is thereby reduced.

It is noted that, if the power supply unit 1-2 is faulty, the output from the power supply unit 1-1 bypasses the power supply unit 1-2 to be supplied to the control unit 2 as a load and, at the same time, the output from the power supply unit 1-1 may be switched to 5.0 V from the voltage slightly higher than 5.0 V (e.g. 5.5 V). In this case, though ripple of the power supplied increases, increase in heat generated at the control unit 2 can be avoided.

Figure 11:
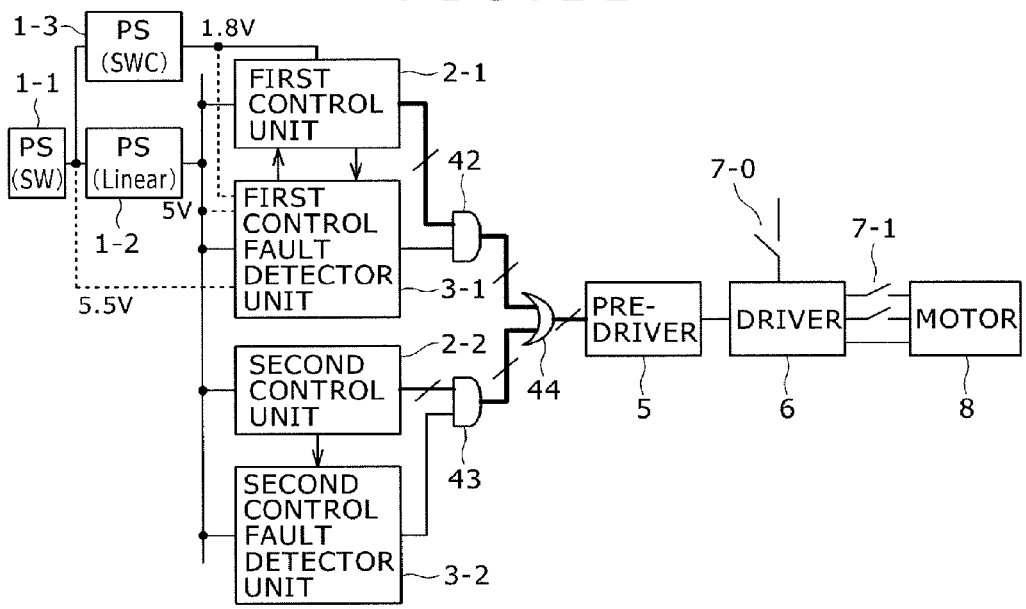
FIG. 11 is a diagram illustrating another example of the sixth embodiment.

Additionally, referring to FIG. 11, a power supply unit 1-3 may be incorporated to supply power of an even lower voltage required by the control unit 2 (microprocessor core operating power supply). In this case, preferably the power supply unit 1-3 is formed using a switched capacitor, which is preferable in terms of, for example, efficiency, cost, and dimensions.

Seventh Embodiment

FIGS. 12 to 17 show embodiments of methods for separating chips for the present invention achieved using the LSI.

Figure 12:
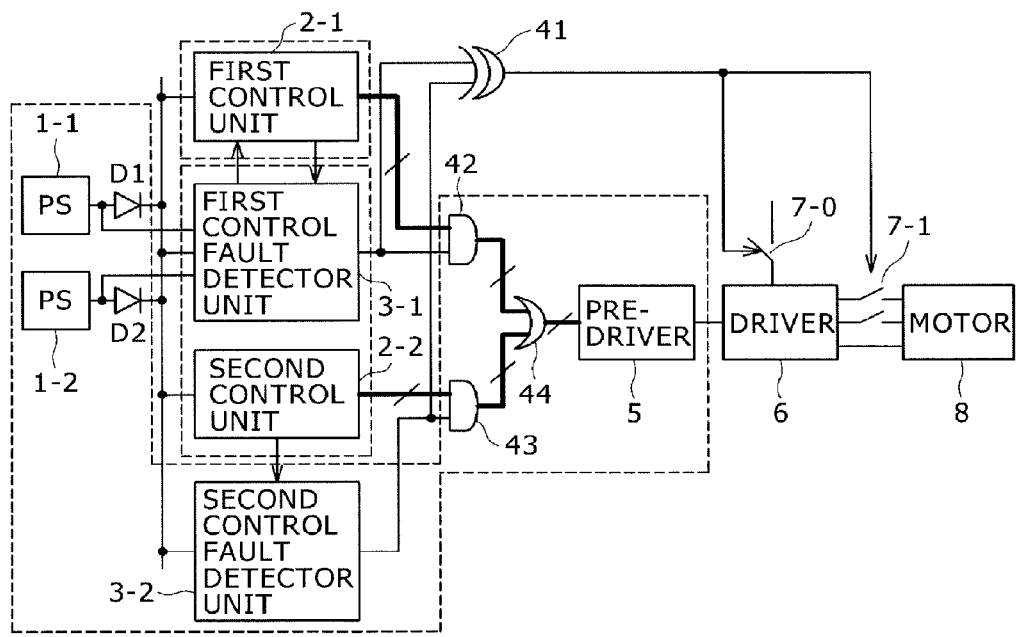
FIG. 12 is a diagram showing an exemplary mounting method relative to semiconductor chips.

FIG. 12 is an embodiment in which a first control unit 2-1 is mounted on a first semiconductor chip, a first control fault detector unit 3-1 and a second control unit 2-2 are mounted on a second semiconductor chip, and power supply units 1-1, 1-2, a second control fault detector unit 3-2, AND gates 42, 43, an OR gate 44, and a pre-driver 5 are mounted on a third semiconductor chip. Preferably, the first semiconductor chip is configured with a main microprocessor, the second semiconductor chip is configured with a sub-microprocessor, and the third semiconductor chip is configured with the LSI, such as an ASIC.

Figure 13:
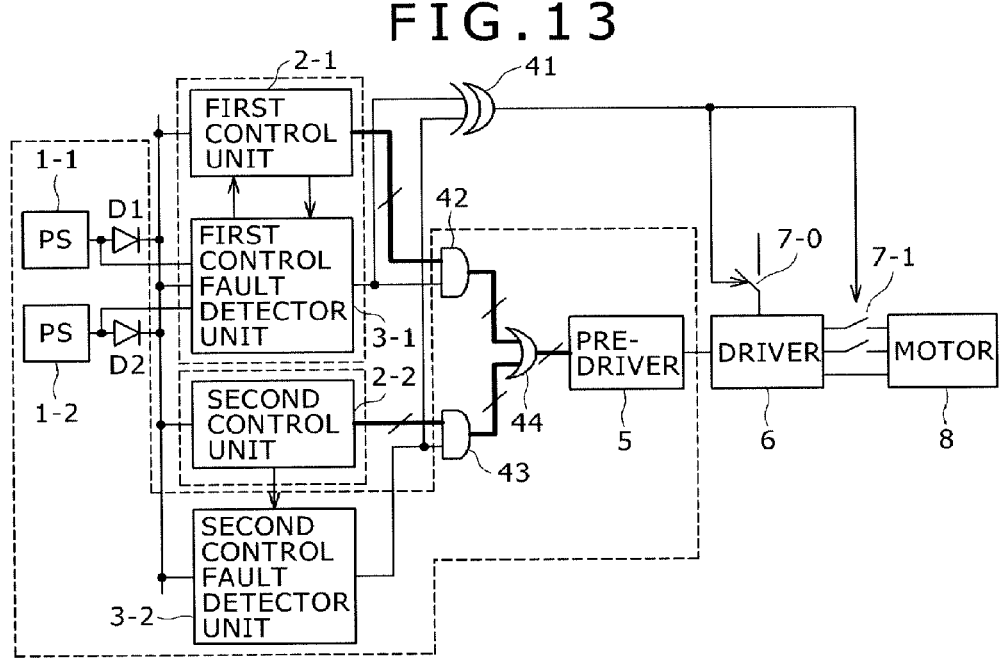
FIG. 13 is a diagram showing an exemplary mounting method relative to semiconductor chips.

FIG. 13 is an embodiment in which the first control unit 2-1 and the first control fault detector unit 3-1 are mounted on a first semiconductor chip, the second control unit 2-2 is mounted on a second semiconductor chip, and the power supply units 1-1, 1-2, the second control fault detector unit 3-2, the AND gates 42, 43, the OR gate 44, and the pre-driver 5 are mounted on a third semiconductor chip. Preferably, the first semiconductor chip is configured with a main microprocessor or, in particular, a safety microprocessor having a self-checking function, the second semiconductor chip is configured with a sub-microprocessor, and the third semiconductor chip is configured with the LSI, such as an ASIC.

Figure 14:
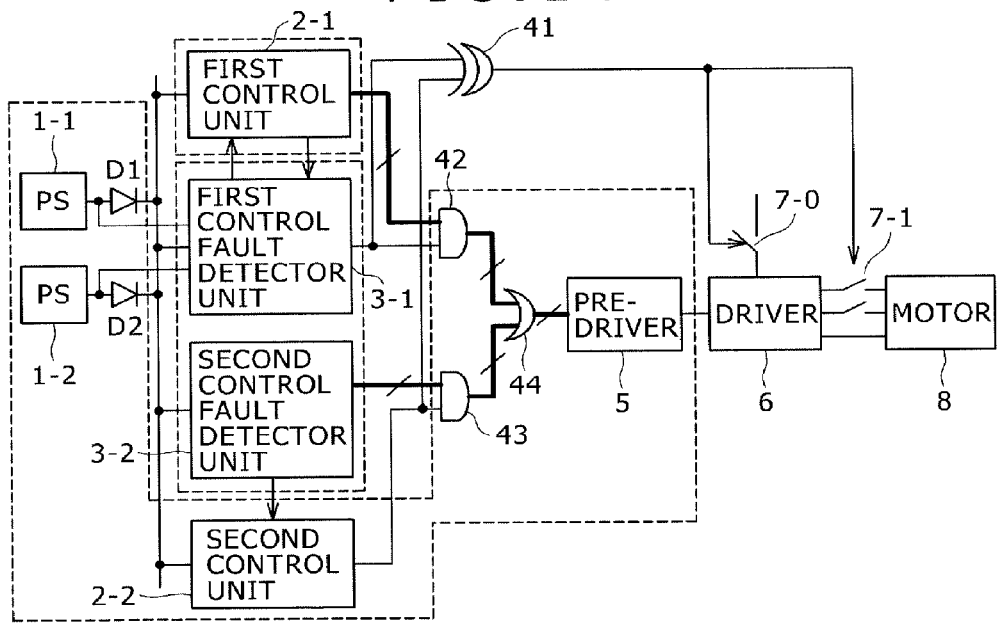
FIG. 14 is a diagram showing an exemplary mounting method relative to semiconductor chips.

FIG. 14 is an embodiment in which the first control unit 2-1 is mounted on a first semiconductor chip, the first control fault detector unit 3-1 and the second control fault detector unit 3-2 are mounted on a second semiconductor chip, and the power supply units 1-1, 1-2, the second control unit 2-2, the AND gates 42, 43, the OR gate 44, and the pre-driver 5 are mounted on a third semiconductor chip. Preferably, the first semiconductor chip is configured with a main microprocessor, the second semiconductor chip is configured with a sub-microprocessor, and the third semiconductor chip is configured with the LSI, such as an ASIC.

Figure 15:
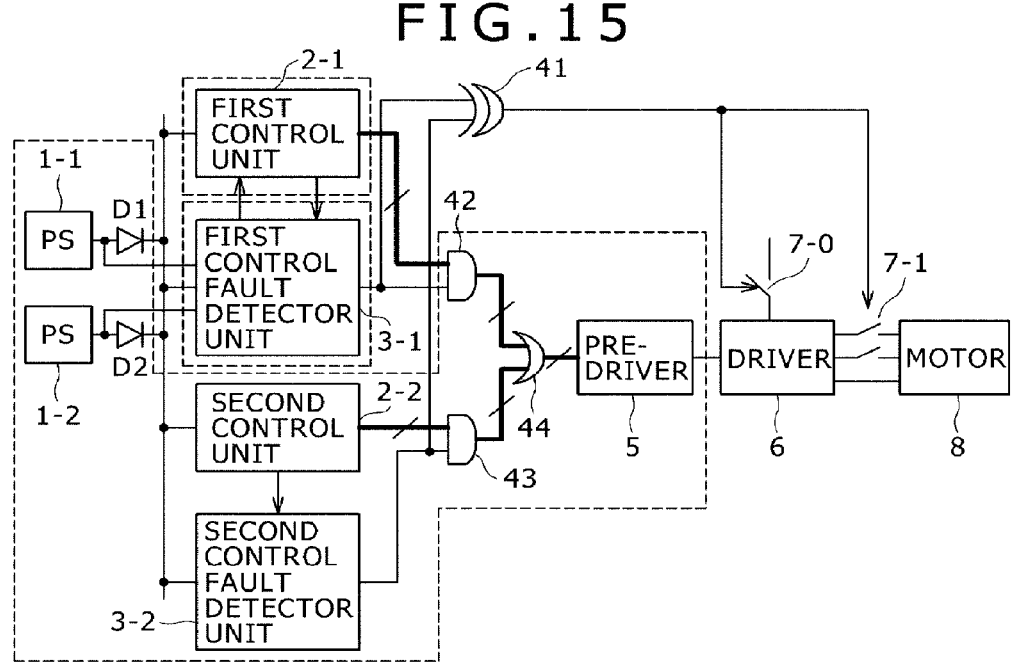
FIG. 15 is a diagram showing an exemplary mounting method relative to semiconductor chips.

FIG. 15 is an embodiment in which the first control unit 2-1 is mounted on a first semiconductor chip, the first control fault detector unit 3-1 is mounted on a second semiconductor chip, and the power supply units 1-1, 1-2, the second control unit 2-2, the second control fault detector unit 3-2, the AND gates 42, 43, the OR gate 44, and the pre-driver 5 are mounted on a third semiconductor chip. Preferably, the first semiconductor chip is configured with a main microprocessor, the second semiconductor chip is configured with a sub-microprocessor, and the third semiconductor chip is configured with the LSI, such as an ASIC.

Figure 16:
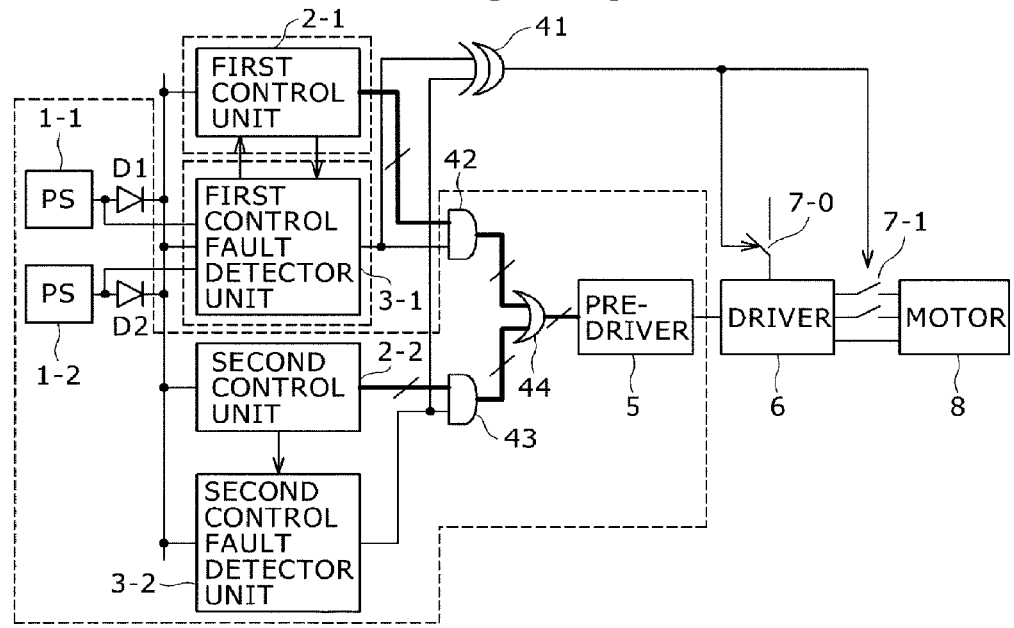
FIG. 16 is a diagram showing an exemplary mounting method relative to semiconductor chips.

FIG. 16 is an embodiment in which the first control unit 2-1 and the first control fault detector unit 3-1 are mounted on a first semiconductor chip and the power supply units 1-1, 1-2, the second control unit 2-2, the second control fault detector unit 3-2, the AND gates 42, 43, the OR gate 44, and the pre-driver 5 are mounted on a third semiconductor chip. Preferably, the first semiconductor chip is configured with a main microprocessor or, in particular, a safety microprocessor having a self-checking function while the third semiconductor chip is configured with the LSI, such as an ASIC.

Figure 17:
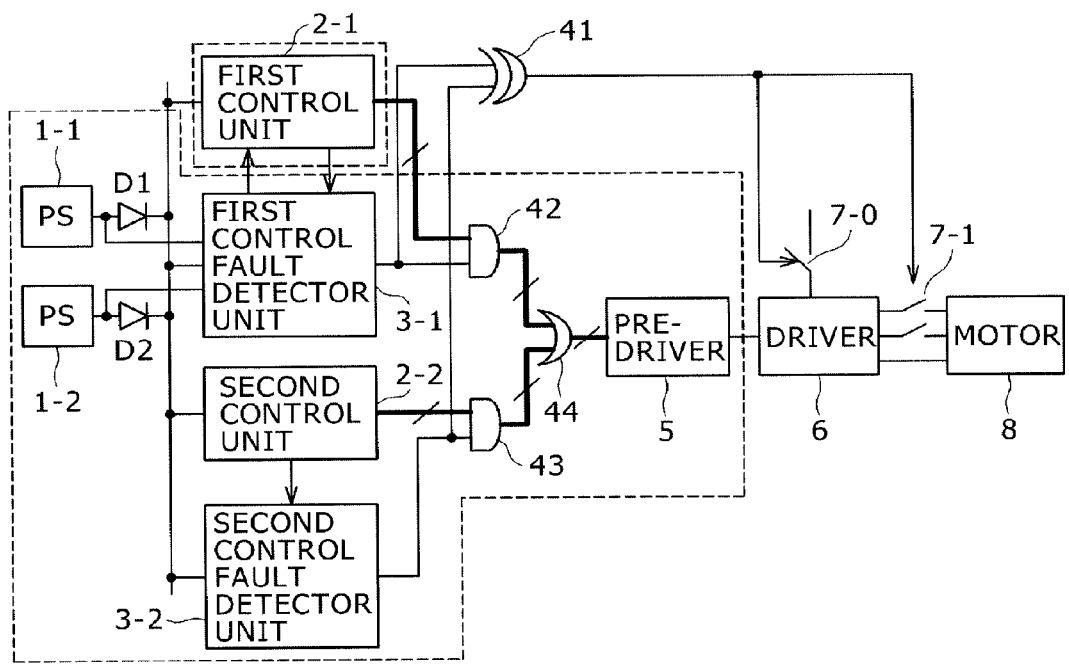
FIG. 17 is a diagram showing an exemplary mounting method relative to semiconductor chips.

FIG. 17 is an embodiment in which the first control unit 2-1 is mounted on a first semiconductor chip and the power supply units 1-1, 1-2, the first control fault detector unit 3-1, the second control unit 2-2, the second control fault detector unit 3-2, the AND gates 42, 43, the OR gate 44, and the pre-driver 5 are mounted on a third semiconductor chip. Preferably, the first semiconductor chip is configured with a main microprocessor and the third semiconductor chip is configured with the LSI, such as an ASIC.

Eighth Embodiment

Figure 18:
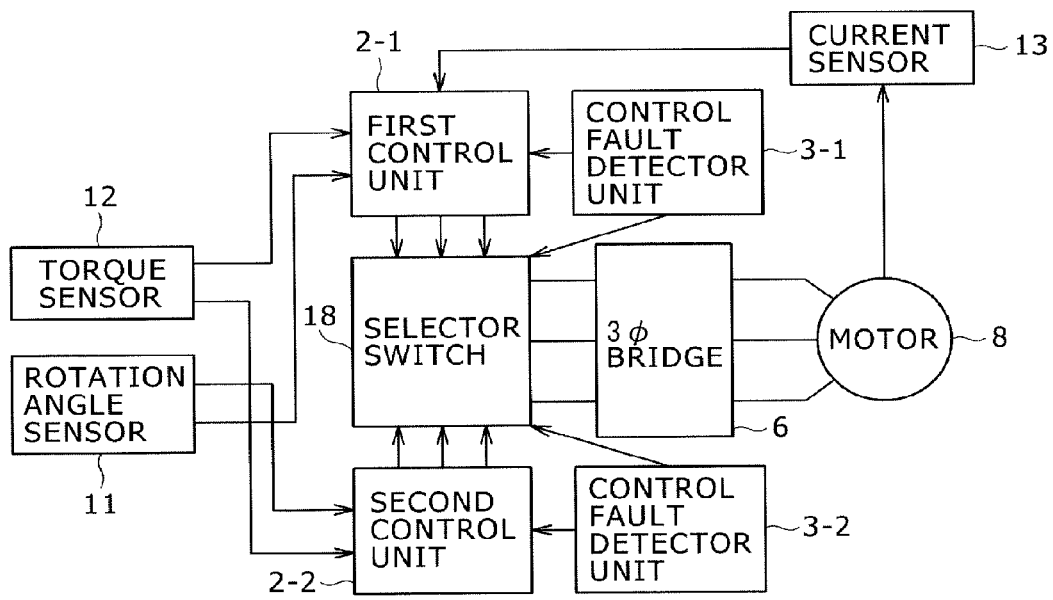
FIG. 18 is a diagram illustrating a configuration of an electric power steering system.

FIG. 18 is a diagram illustrating a configuration of an electric power steering system according to an aspect of the present invention. The electric power steering system applies a steering assist force by a motor 8 to an automotive steering system. The electric power steering system includes the motor 8, a rotation angle sensor 11, a torque sensor 12, a current sensor 13, a first control unit 2-1, fault detector units 3-1, 3-2, a second control unit 2-2, a selector switch (selection changeover unit) 18, and a 3 three-phase bridge 6.

The motor 8 is disposed at, for example, a steering gearbox of the steering system. The motor 8 is configured so as to apply the steering assist force to, for example, a steering shaft. The rotation angle sensor 11 is mounted on the motor 8, detecting a rotation angle (a magnetic pole position) of the motor 8.

The torque sensor 12 is mounted on a steering wheel (not shown) of the electric power steering system, detecting steering torque received by the steering wheel. The current sensor 13 is mounted on the motor 8, detecting motor current that flows through the motor 8.

The first control unit 2-1 controls the motor 8 based on the rotation angle detected by the rotation angle sensor 11, the steering torque detected by the torque sensor 12, and the motor current detected by the current sensor 13. The first control unit 2-1 includes a microprocessor (MPU) and performs closed-loop control using the motor current.

When a fault occurs in the first control unit 2-1, the second control unit 2-2 controls the motor 8 in place of the first control unit 2-1 based on the rotation angle detected by the rotation angle sensor 11 and the steering torque detected by the torque sensor 12. As will be described later, the second control unit 2-2 is configured with fixed logic circuitry, performing open-loop control without using the motor current.

The fault detector units 3-1, 3-2 detect faults in the first control unit 2-1 and the second control unit 2-2, respectively. When the fault detector unit 3-1 determines that the first control unit 2-1 is operational, the selector switch 18 selects the output from the first control unit 2-1 to thereby drive the three-phase bridge (driver) 6, thereby driving the motor 8.

If the fault detector unit 3-1 determines that the first control unit 2-1 is faulty and the fault detector unit 3-2 determines that the second control unit 2-2 is operational, the selector switch 18 selects the output from the second control unit 2-2 to thereby drive the three-phase bridge 6, thereby driving the motor 8.

Figure 19:
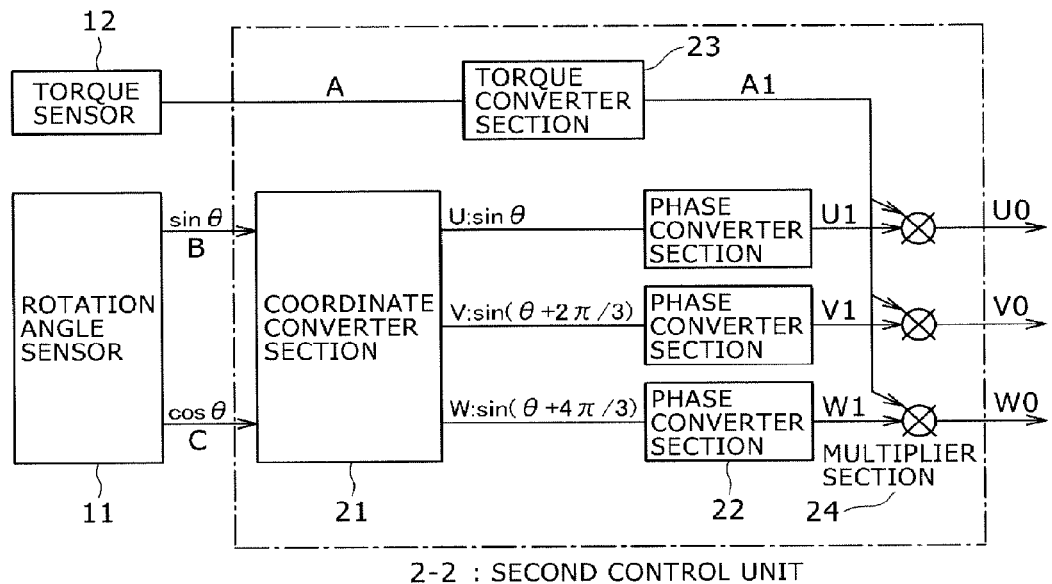
FIG. 19 is a diagram showing an exemplary second control unit.

FIG. 19 is a diagram illustrating a detailed arrangement of the second control unit in FIG. 18. The second control unit 2-2 detects the steering effort on the steering system based on the rotation angle detected by the rotation angle sensor 11 and the steering torque detected by the torque sensor 12, thereby controlling to output PWM current to be output to the motor 8, variable in proportion to the steering effort thus detected.

The second control unit 2-2 is configured with fixed logic circuitry including an analog circuit and a digital circuit. Referring to FIG. 19, the second control unit 2-2 includes a coordinate converter section 21, a phase converter section 22, a torque converter section 23, and a multiplier section 24.

The coordinate converter section 21 subjects a $\sin \theta$ signal B and a $\cos \theta$ signal C input from the rotation angle sensor 11 to coordinate converter section into a three-phase sin signal (e.g., U: $\sin \theta$, V: $\sin (\theta+2\pi/3)$, W: $\sin (\theta+4\pi/3)$). The phase converter section 22 converts the three-phase sin signal (U, V, W) that has undergone the coordinate converter section at the coordinate converter section 21 to a corresponding digital phase signal (U1, V1, W1).

The torque converter section 23 coverts an analog torque signal A input from the torque sensor 12 to a corresponding digital torque signal A1. The multiplier section 24 multiplies the digital phase signal (U1, V1, W1) by the digital torque signal A1 to thereby calculate drive signals Uo, Vo, Wo of respective phases that serve as motor drive signals, thereby processing to output results to the selector switch 18.

Figure 20:
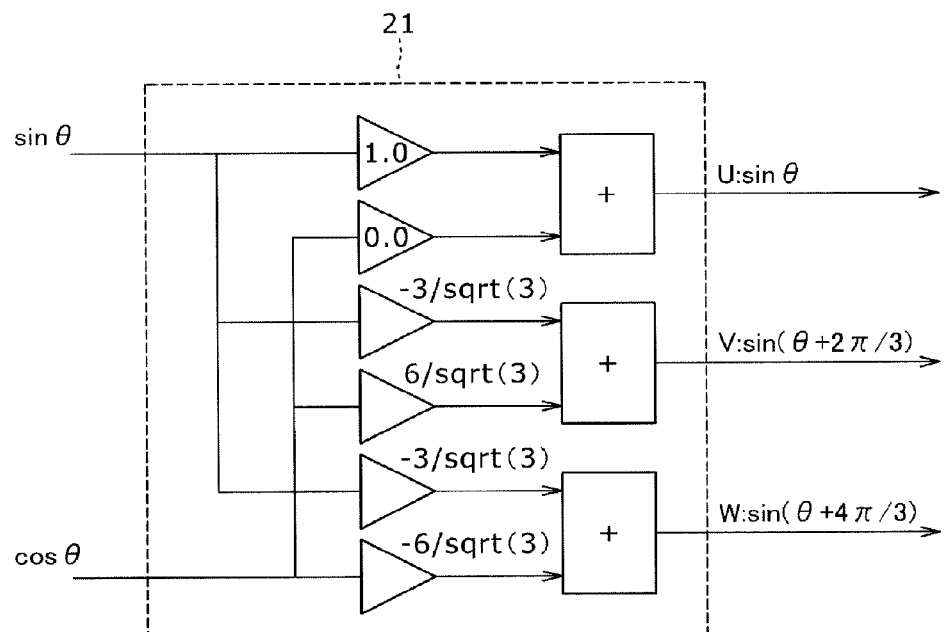
FIG. 20 is a diagram illustrating a configuration of a coordinate converter section 21.

FIG. 20 is a diagram showing a detailed configuration of the coordinate converter section 21 shown in FIG. 19. The coordinate converter section 21 performs weighting and addition of the $\sin \theta$ signal and the $\cos \theta$ signal input from the rotation angle sensor 11 to thereby generate three-phase signals of U, V, and W with a phase difference of 120° from each other.

Figure 21:
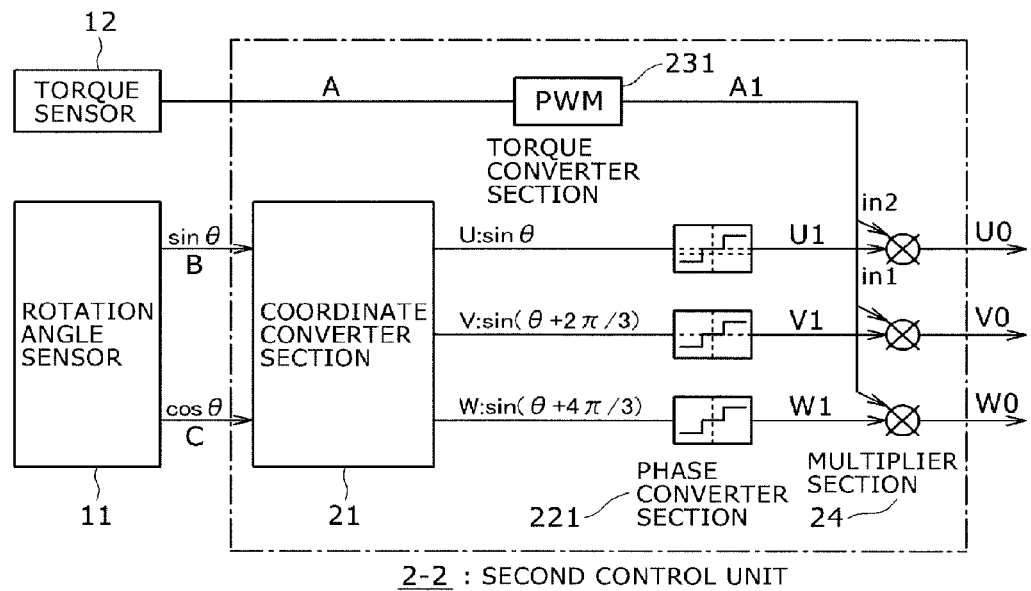
FIG. 21 is a diagram showing an exemplary second control unit.

FIG. 21 is a diagram showing a specific example of the second control unit. The second control unit 2-2 of example 1 is configured such that magnetic pole position information is represented by a three-valued digital signal and target torque information by a three-valued PWM signal. Referring to FIG. 21, the coordinate converter section 21 converts the $\sin \theta$ signal B and the $\cos \theta$ signal C input from the rotation angle sensor 11 to three-phase sin signals (U, V, W). The resultant three-phase sin signals here have sin waveforms, each of which having a phase advancing 0, $2/3\pi$, and $4/3\pi$, respectively, from the sin signal (U: $\sin \theta$, V: $\sin (\theta+2\pi/3)$, W: $\sin (\theta+4\pi/3)$).

A phase converter section 221 converts the three-phase sin signals (U, V, W) to digital phase signals (U1, V1, W1), each having any of three values of (−1, 0, 1), determined according to the magnitude of the three-phase sin signals.

A torque converter section 231 converts the analog torque signal A transmitted from the torque sensor 12 to the digital torque signal A1 having a PWM waveform of a duty ratio that is proportional to the magnitude of the torque signal A.

The multiplier section 24 multiplies the digital phase signals (U1, V1, W1) converted by the phase converter section 221 by the digital torque signal A1 with a PWM waveform converted by the torque converter section 231, to thereby calculate the drive signals Uo, Vo, Wo of three phases and output the resultant as motor control signals.

The second control unit 2-2 of example 1 converts the three-phase sin signals (U, V, W) to the three-valued digital phase signals (U1, V1, W1) of (−1, 0, 1) using the phase converter section 221. This permits handling of the digital signals for subsequent processing. In addition, the three-valued digital signals simplify the calculation (multiplication) circuit as compared with a multi-valued digital signal.

Further, the torque converter section 231 converts the torque signal A to the digital torque signal A1 with a PWM waveform, so that the digital signal can be handled subsequently. In addition, the binary or three-valued digital signal simplifies the calculation (multiplication) circuit as compared with a multi-valued digital signal.

In example 1, the output torque of the motor 8 can be controlled with a simple circuit in proportion to the torque signal (steering effort by a driver) when the first control unit 2-1 is faulty, so that smooth control can continue just as the driver intends.

If the second control unit 2-2 illustrated above is combined with the first control unit 2-1 as shown in FIG. 18, the first control unit 2-1 and the second control unit 2-2 theoretically achieve the same operation, so that the second control unit 2-2 can perform the function of the first control unit 2-1 should the first control unit 2-1 fail.

Figure 22:
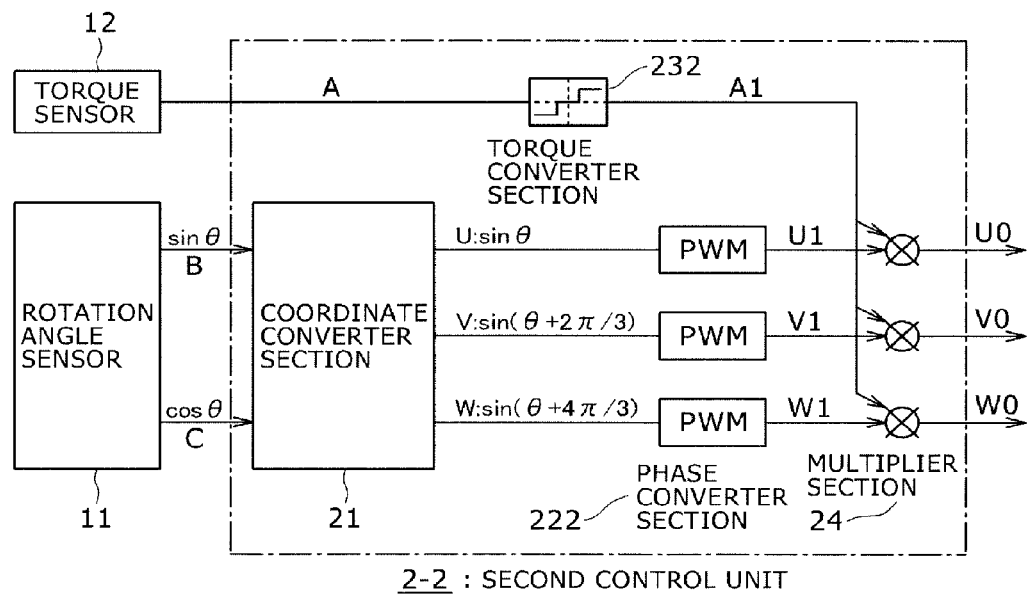
FIG. 22 is a diagram showing an exemplary second control unit.

FIG. 22 is a diagram showing another example of the second control unit. PWM signals are generated from the three-phase sin signals (U, V, W) generated based on the $\sin \theta$ signal B and the $\cos \theta$ signal C input from the rotation angle sensor 11. A torque converter section 232 then converts the analog torque signal A transmitted from the torque sensor 12 to three-valued digital torque signals A1, each taking any of three values of (−1, 0, 1) indicating left, middle, or right.

The multiplier section 24 multiplies the PWM signals (U1, V1, W1) generated from the three-phase sin signals (U, V, W) by the three-valued digital torque signal A1 generated from the torque signal A, to thereby output the drive signals (Uo, Vo, Wo) of three phases.

In this example, the torque converter section 232 converts the torque signal A to the three-valued digital torque signals A1 having three values of (−1, 0, 1). This permits handling of the digital signals for subsequent processing. In addition, the three-valued, not multi-valued, digital signals simplify the calculation (multiplication) circuit as compared with a multi-valued digital signal.

Further, the PWM signals (U1, V1, W1) are generated from the three-phase sin signals (U, V, W), so that the digital signals can be handled subsequently. In addition, the binary or three-valued digital signal simplifies the calculation (multiplication) circuit as compared with a multi-valued digital signal.

The electric power steering system having the foregoing arrangements includes the first control unit 2-1 and the second control unit 2-2. The first control unit 2-1 controls the motor 8 that applies the steering assist force to the automotive steering system based on the motor current of the motor 8, the rotation angle of the motor 8, and the steering torque. The second control unit 2-2 controls the motor 8 in place of the first control unit 2-1 when a fault occurs in the first control unit 2-1, based on the rotation angle of the motor 8 and the steering torque. The first control unit 2-1 performs the closed-loop control that uses the motor current. When a fault occurs in the first control unit 2-1, the second control unit 2-2 performs the open-loop control that does not use the motor current.

This allows the arrangements of the second control unit 2-2 to be simplified as compared with those of the first control unit 2-1. The general arrangements of the system can be simplified compared with the related art system having two control units that perform the closed-loop control. Redundancy of the electric power steering system 1 can thus be achieved with an even simpler structure and at even lower cost.

Additionally, in this embodiment, when a fault occurs in the first control unit 2-1, the motor output torque can be smoothly controlled according to the magnetic pole position of the motor 8 with a simple circuit, which allows motor control with small torque ripple to continue.

Ninth Embodiment

Figures 23, 24:
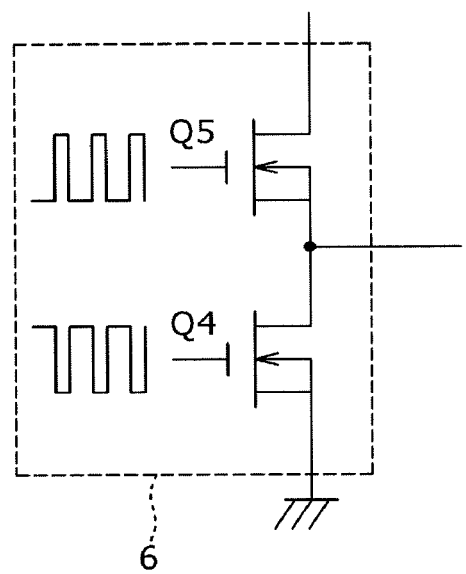
FIG. 23 is a diagram showing an exemplary multiplier section.
FIG. 24 is a diagram showing an exemplary PWM output command.

FIG. 23 is an embodiment of the multiplier section 24 particularly preferable for the embodiment shown in FIG. 21.

Figure 25:
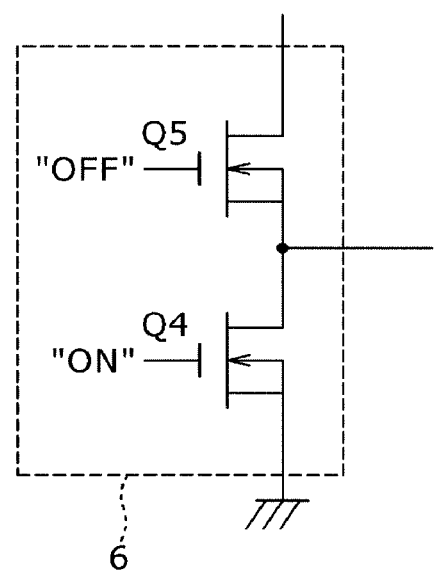
FIG. 25 is a diagram showing an exemplary lower arm ON command.
Figure 26:
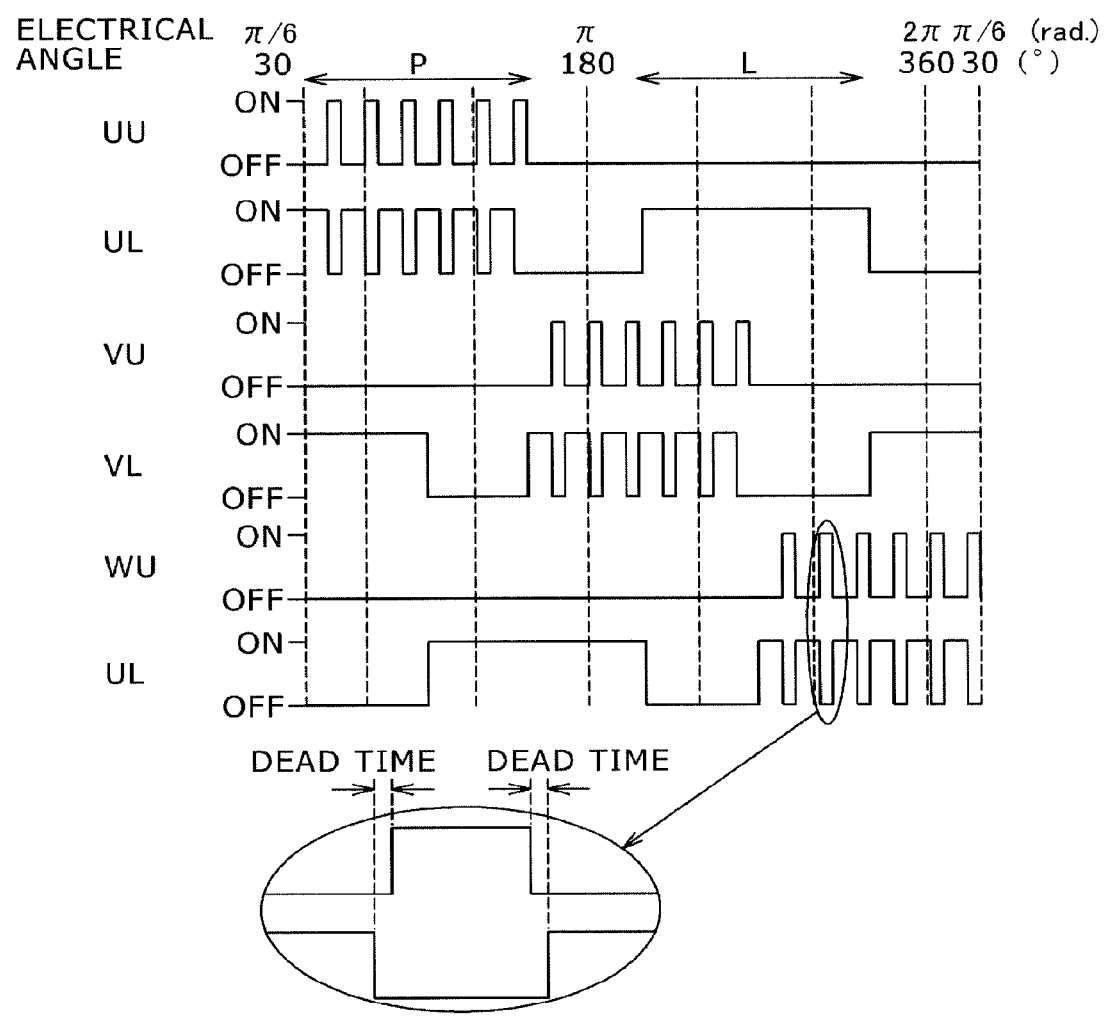
FIG. 26 is a chart showing an exemplary output waveform of the multiplier section.
Figure 27:
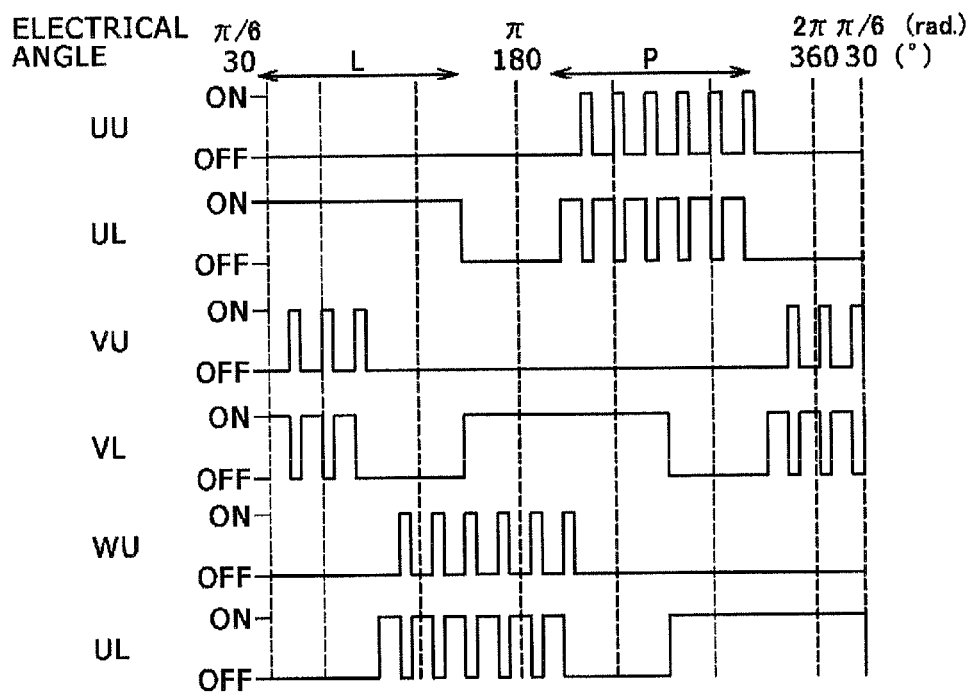
FIG. 27 is a chart showing another exemplary output waveform of the multiplier section.

In the table shown in FIG. 23, the column is an input in1, the row is an input in2, and the intersection point is an output value. According to the arrangements of the second control unit shown in FIG. 21, the input in1 takes three values of 1, 0, and −1, the input in2 takes three values of P (a PWM value proportional to a torque sensor input value (positive)), 0, and −P (a PWM value proportional to a torque sensor input value (negative)), and the output takes P (a PWM output command shown in FIG. 24), 0, and L (a lower arm ON command shown in FIG. 25). Exemplary output waveforms according to this embodiment are shown in FIGS. 26 and 27. FIG. 26 shows the exemplary output waveforms when the torque sensor output value is positive. FIG. 27 shows the exemplary output waveforms when the torque sensor output value is negative.

Tenth Embodiment

Figure 28:
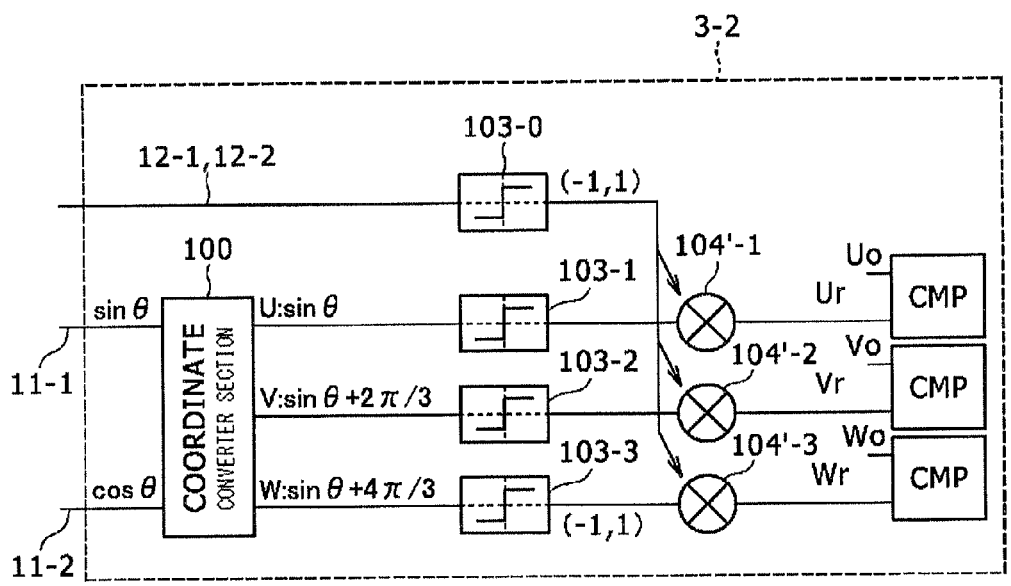
FIG. 28 is a diagram showing an exemplary second control fault detector unit.
Figures 29, 30, 31:
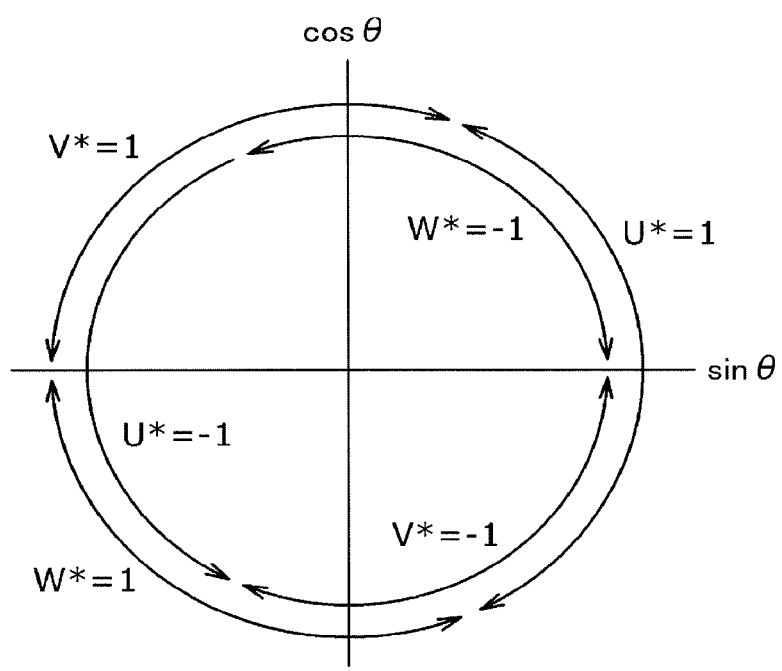
FIG. 29 is a diagram illustrating an embodiment of the multiplier section.
FIG. 30 is a diagram illustrating an embodiment of a CMP.
FIG. 31 is a diagram illustrating an embodiment that finds an ON-enable condition directly from a magnetic pole position.

FIG. 28 shows an embodiment of the second control fault detector unit 3-2. To configure the second control fault detector unit 3-2 as a circuit simpler than the second control unit 2-2, torque sensor signals 12-1, 12-2 and magnetic pole position information are binarized and signals Ur, Vr, Wr that permit control signals of three phases Uo, Vo, Wo to turn ON are generated as shown in FIG. 28. A CMP checks whether the corresponding control signal of each phase Uo, Vo, or Wo is turned ON when it is so permitted, thereby diagnosing the second control unit 2-2. FIG. 29 shows an embodiment of multipliers 104-1 to 104-2 and FIG. 30 shows an embodiment of the CMP.

Eleventh Embodiment

Alternatively, a condition that permits the control signal of each phase Uo, Vo, or Wo to turn ON may be obtained directly from the magnetic pole position. FIG. 31 is a graph showing a relationship among values of U*, V*, and W* binarized from the U, V, and W signals, magnetic pole positions, and sin θ and cos θ from the rotation angle sensor 11. Results shown in FIGS. 32 to 34 are obtained when the second control unit 2-2 is determined to be operational or faulty from values (P, O, L) taken by the control signals of the different phases Uo, Vo, Wo, sin θ and cos θ, and torque τ, using the graph shown in FIG. 31.

To further simplify the determination, FIG. 31 is subjected to quadrant determination, specifically, whether the values of sin θ and cos θ are determined to be positive or negative, to obtain results shown in FIGS. 35 to 37.

Twelfth Embodiment

Figure 38:
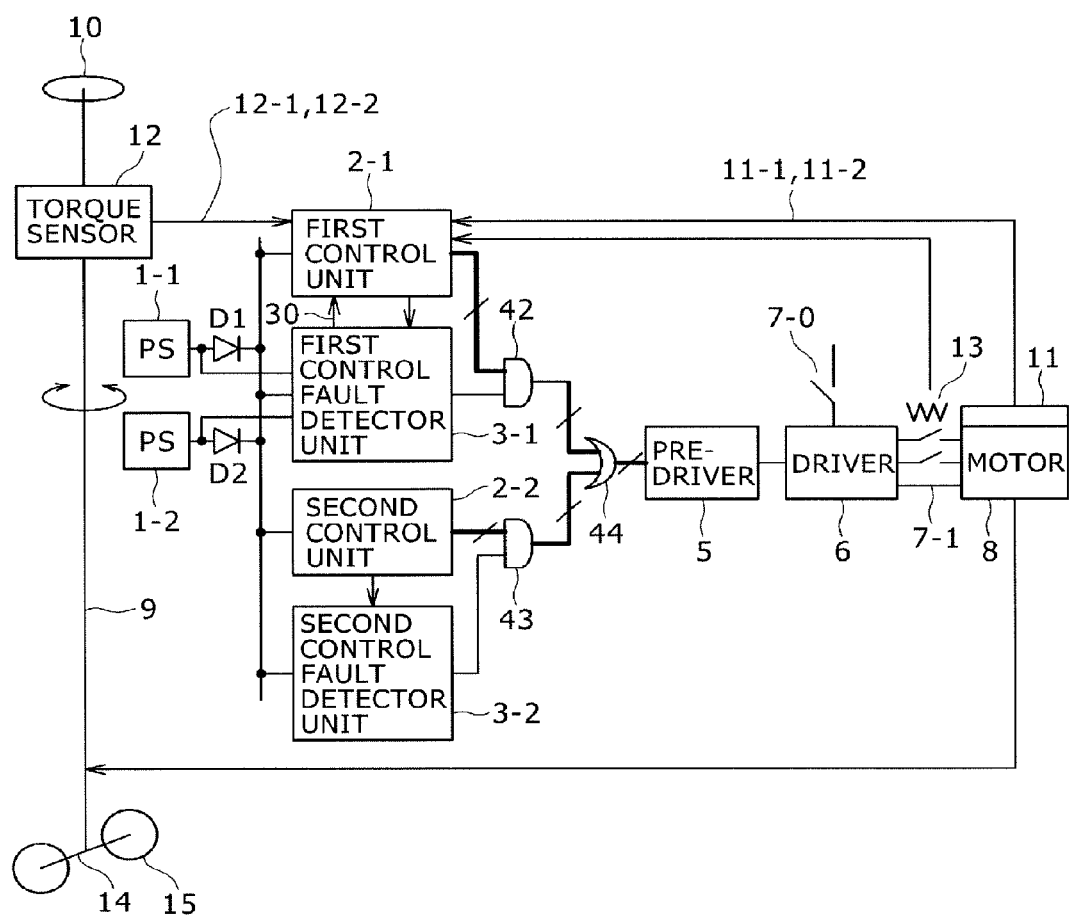
FIG. 38 is a block diagram showing a power steering control apparatus according to the present invention.

FIG. 38 is an embodiment in which the present invention is applied to an electric power steering system.

The motor 8 driven by the driver 6 applies steering torque to a shaft 9 and a steering function 14 of a steering wheel 10 to thereby assist a manual steering effort applied to the steering wheel 10.

In the electric power steering system, outputs 12-1, 12-2 of a torque sensor 12 mounted on the shaft 9, outputs 11-1, 11-2 of a rotation angle sensor 11, and a measured value of a current sensor 13 are applied to the first control unit 2-1. The torque sensor 12 then measures the steering effort applied to the steering wheel 10 and the motor 8 is controlled so as to output torque corresponding to the measured steering effort. The manual steering effort applied to the steering wheel 10 is thereby assisted.

The embodiment allows the steering assist operation to continue when a fault occurs without inviting an increase in the number of hardware devices. If a correct operation is not ensured, steering assist through the motor 8 is properly stopped to thereby ensure safety.

The electronic control apparatus described heretofore allows the electronic control apparatus to continue operating without inviting an increase in the number of hardware devices even when a fault occurs. If a correct operation is not ensured, the operation is properly stopped to thereby ensure safety.

While the present invention has been particularly described with reference to various embodiments, it will be understood that the embodiments are not intended to limit the present invention and various changes in form and detail may be made therein without departing from the spirit and scope of the invention. For example, the embodiments described heretofore have been described in detail to make an easier understanding of the present invention and should not to be construed to be required to include all of the arrangements described above. Part of arrangements of one embodiment may be replaced with another in arrangements of another embodiment. Arrangements of one embodiment may also be added to arrangements of another embodiment. Further, arrangements of one embodiment may be added to, deleted from, or may replace, part of arrangements of each of the embodiments.

The invention claimed is:

1. An electronic control apparatus comprising:
   a control unit that outputs a control signal configured to drive a motor, the motor being configured to apply a steering torque to a steering wheel;
   a plurality of power voltage regulators that are configured to supply the control unit with a predetermined voltage that is lower than a regular operational voltage supplied to the control unit; and
   a power supply fault detector unit for detecting a fault in the plurality of voltage regulators, wherein the control unit operates in a normal mode on electric power supplied from the plurality of voltage regulators, when none of the plurality of voltage regulators is faulty; and
   wherein if at least one of the plurality of voltage regulators is faulty, the control unit operates in an energy saving mode in which a voltage supplied to the control unit is the predetermined voltage, so as to enable continued operation of the electronic control apparatus even when the at least one of the plurality of power voltage regulators is faulty.

2. The electronic control apparatus according to claim 1, further comprising:
a battery, and
a generator, wherein the plurality of voltage regulators are connected to a battery or a generator.

3. The electronic control apparatus according to claim 1, wherein the control unit includes clock reduction means that reduces an operating clock frequency of a processor constituting the control unit in the energy saving mode.

4. The electronic control apparatus according to claim 1, wherein the control unit includes a master control unit and a slave control unit, the master control unit being operated in the normal mode and the slave control unit being operated in the energy saving mode.

5. The electronic control apparatus according to claim 1, wherein the plurality of voltage regulators are connected in parallel with each other, sharing an output current with each other.

6. The electronic control apparatus according to claim 1, wherein the plurality of voltage regulators are connected in series with each other, sharing a voltage drop with each other.

7. An electric power steering control apparatus incorporating the electronic control apparatus according to claim 1,
wherein the control unit operates, having as inputs applied thereto an output from a torque sensor disposed on a shaft, an output from a rotation angle sensor disposed concentrically with the motor, and a value measured by a current sensor; and
wherein the motor applies steering torque to a shaft and a steering function.

8. The electronic control apparatus according to claim 1, wherein the voltage regulators are directly connected to the control unit.

9. The electronic control apparatus according to claim 3, wherein the control unit includes parameter change means that changes a control parameter at the control unit in the energy saving mode.

10. The electronic control apparatus according to claim 4, wherein the slave control unit has a circuit scale smaller than that of the master control unit.

11. The electronic control apparatus according to claim 4, wherein the slave control unit is configured with fixed logic circuitry.

12. The electronic control apparatus according to claim 4, wherein the slave control unit is operated when a fault occurs in the master control unit with all of the plurality of voltage regulators remaining fully operational.

13. An electric power steering system comprising:
a motor that applies a steering assist force to a steering system of an automobile;
a current sensor that detects motor current flowing through the motor;
a rotation angle sensor that detects a rotation angle of the motor;
a torque sensor that detects steering torque to be transmitted to the steering system;
a first control unit that controls the motor based on the motor current, the rotation angle, and the steering torque;
a second control unit that, when a fault occurs in the first control unit, controls the motor based on the rotation angle and the steering torque in place of the first control unit, and
a plurality of voltage regulators that are configured to supply the control unit with a predetermined voltage that is lower than a regular operational voltage supplied to the control unit.

14. The electric power steering system according to claim 13,
wherein the second control unit detects a steering effort on the steering system based on the rotation angle and the steering torque and outputs pulse width modulation current proportional to the steering effort thus detected to the motor.

15. The electric power steering system according to claim 13,
wherein the second control unit is configured with fixed logic circuitry including an analog circuit and a digital circuit.

16. The electric power steering system according to claim 13,
wherein the voltage regulators are directly connected to at least one of the first or second control unit.

* * * * *